United States Patent
Enteshari et al.

(10) Patent No.: US 11,647,122 B2
(45) Date of Patent: *May 9, 2023

(54) SYSTEM AND METHOD FOR DISTRIBUTED CALL PROCESSING AND AUDIO REINFORCEMENT IN CONFERENCING ENVIRONMENTS

(71) Applicant: Shure Acquisition Holdings, Inc., Niles, IL (US)

(72) Inventors: Ali Enteshari, Chicago, IL (US); Martin K. Reiling, Grayslake, IL (US); Ryan Jerold Perkofski, Lake Bluff, IL (US); Matthew Curtis Morrow, Chicago, IL (US); Michael Ryan Lester, Colorado Springs, CO (US)

(73) Assignee: Shure Acquisition Holdings, Inc., Niles, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/140,687

(22) Filed: Jan. 4, 2021

(65) Prior Publication Data

US 2021/0266409 A1    Aug. 26, 2021

Related U.S. Application Data

(63) Continuation of application No. 16/197,162, filed on Nov. 20, 2018, now Pat. No. 10,887,467.

(51) Int. Cl.
*H04M 3/42* (2006.01)
*H04M 3/56* (2006.01)
(Continued)

(52) U.S. Cl.
CPC ........... *H04M 3/568* (2013.01); *H04M 9/082* (2013.01); *H04R 1/406* (2013.01); *H04R 3/005* (2013.01); *H04M 2203/509* (2013.01)

(58) Field of Classification Search
CPC . H04M 3/568; H04M 9/082; H04M 2203/509
(Continued)

(56) References Cited

U.S. PATENT DOCUMENTS 5,848,146 A    12/1998  Slattery
6,987,992 B2    1/2006  Hundal
(Continued)

FOREIGN PATENT DOCUMENTS

CN    103152546    6/2013
CN    105702261    6/2016
(Continued)

OTHER PUBLICATIONS

Calisto 600 Series Support, <https://www.poly.com/us/en/support/product/calisto-600>, Oct. 2017, 3 pp.
(Continued)

*Primary Examiner* — William J Deane, Jr.
(74) *Attorney, Agent, or Firm* — Neal, Gerber & Eisenberg LLP

(57) ABSTRACT

Systems, apparatus, and methods for processing audio signals associated with conferencing devices communicatively connected in a daisy-chain configuration using local connection ports included on each device are provided. One method involving a first conferencing device comprises receiving auxiliary mixed microphone signal(s) from at least one other conferencing device via at least one local connection port, each auxiliary signal comprising a mix of microphone signals captured by the at least one other conferencing device; determining a gain adjustment value for each auxiliary mixed microphone signal based on a daisy-chain position of the at least one other conferencing device relative to the position of the first conferencing device; adjusting a gain value for each auxiliary mixed microphone signal based on the corresponding gain adjustment value; generating a
(Continued)

loudspeaker output signal from the gain-adjusted auxiliary mixed microphone signal(s); and providing the loudspeaker signal to the loudspeaker of the first conferencing device.

18 Claims, 6 Drawing Sheets

(51) Int. Cl.
*H04M 9/08* (2006.01)
*H04R 1/40* (2006.01)
*H04R 3/00* (2006.01)

(58) Field of Classification Search
USPC .......................................... 379/202.01, 158
See application file for complete search history.

(56) References Cited

U.S. PATENT DOCUMENTS

| | | | |
|---|---|---|---|
| 7,221,663 B2 | 5/2007 | Rodman | |
| 7,245,710 B1 | 7/2007 | Hughes | |
| 7,826,624 B2 | 11/2010 | Oxford | |
| 7,916,849 B2 | 3/2011 | Bathurst | |
| 7,970,150 B2 | 6/2011 | Oxford | |
| 7,995,731 B2* | 8/2011 | Vernick | H04M 3/387 379/202.01 |
| 8,379,823 B2 | 2/2013 | Ratmanski | |
| 8,391,522 B2 | 3/2013 | Biundo Lotito | |
| 8,416,935 B2 | 4/2013 | Coleman | |
| 8,559,611 B2 | 10/2013 | Ratmanski | |
| 8,644,525 B2* | 2/2014 | Bathurst | H04R 1/406 381/94.1 |
| 8,670,554 B2 | 3/2014 | Mukund | |
| 8,687,820 B2 | 4/2014 | Truong | |
| 8,878,891 B2 | 11/2014 | Kenoyer | |
| 8,947,487 B2 | 2/2015 | Rodman | |
| 8,965,002 B2 | 2/2015 | Oh | |
| 8,989,360 B2 | 3/2015 | Couse | |
| 9,338,301 B2 | 5/2016 | Pocino | |
| 9,445,053 B2 | 9/2016 | Cartwright | |
| 10,073,607 B2 | 9/2018 | Kim | |
| 10,397,722 B2 | 8/2019 | Eronen | |
| 2002/0071573 A1 | 6/2002 | Finn | |
| 2003/0165163 A1* | 9/2003 | Bader | H04L 12/1854 370/537 |
| 2005/0281410 A1* | 12/2005 | Grosvenor | H04H 60/47 381/61 |
| 2005/0286443 A1* | 12/2005 | McMillen | H04M 3/56 370/352 |
| 2005/0286696 A1* | 12/2005 | Bathurst | H04M 1/6033 379/202.01 |
| 2005/0286697 A1* | 12/2005 | Bathurst | H04M 1/6033 379/202.01 |
| 2006/0013416 A1* | 1/2006 | Truong | H04M 3/568 379/202.01 |
| 2008/0152160 A1 | 6/2008 | Chew | |
| 2008/0205665 A1* | 8/2008 | Tokuda | H04M 1/6033 370/260 |
| 2008/0232569 A1* | 9/2008 | Diethorn | H04M 3/568 379/202.01 |
| 2009/0252315 A1* | 10/2009 | Ratmanski | H04M 3/56 379/202.01 |
| 2009/0252316 A1 | 10/2009 | Ratmanski | |
| 2011/0103624 A1* | 5/2011 | Ferren | H04N 7/142 348/E7.083 |
| 2012/0076319 A1 | 3/2012 | Terwal | |
| 2013/0089213 A1 | 4/2013 | Heine | |
| 2016/0112574 A1 | 4/2016 | Harper | |
| 2017/0041445 A1 | 2/2017 | Ukai | |
| 2018/0310114 A1* | 10/2018 | Eronen | H04R 1/406 |
| 2019/0342685 A1* | 11/2019 | Fielder | H04S 3/004 |

FOREIGN PATENT DOCUMENTS

| | | |
|---|---|---|
| CN | 106782584 | 5/2017 |
| JP | 2004208051 | 7/2004 |
| JP | 2006238258 | 9/2006 |
| WO | 2006057695 | 6/2006 |
| WO | 2017164954 | 9/2017 |
| WO | 2017176326 | 10/2017 |

OTHER PUBLICATIONS

Electronic Contracting Company, Voice Lift Acoustic Enhancement, <https://eccoinc.com/system/voice-lift-acoustic-enhancement, Mar. 2017, 1p.
International Search Report and Written Opinion for PCT/US2019/061758 dated Feb. 18, 2020, 12 pp.
Lindemann, "Q-Sys Acoustic Echo Cancellation (AEC) With Non-Linear Processing, Noise Reduction, and Comfort Noise Generation," QSC, vol. 2.1, Jul. 12, 2013, 25 pp.
Meeteasy MVOICE 8000-B Bluetooth Speakerphone for Audio conferencing via VoIP Softphone and Mobile Phone , <https://www.amazon.com/dp/B07111C15F?psc=1>, Oct. 2017, 9 pp.
Press Release, Phoenix Audio Technologies to Introduce the New Stingray at UC Expo and Infocomm 2017, Phoenix Audio Technologies, Date unknown but believe to be at least as early as Nov. 22, 2017, 2 pp.
Quattro3 Conference Speakerphone, Model 305, User Manual, Phoenix Audio Technologies, Date unknown but believe to be at least as early as Nov. 22, 2017, 10 pp.
Quattro3 USB—MT304, <https://www.phnxaudio.com/quattro3/mt304/>, May 2017, 4 pp.
XAP Audio Conferencing, Brochure, ClearOne Communications, 2002, 78 pp.

* cited by examiner

SYSTEM AND METHOD FOR DISTRIBUTED CALL PROCESSING AND AUDIO REINFORCEMENT IN CONFERENCING ENVIRONMENTS

CROSS-REFERENCE

This application is a continuation of U.S. patent application Ser. No. 16/197,162, filed on Nov. 20, 2018, the contents of which are incorporated herein by reference in their entirety.

TECHNICAL FIELD

This application generally relates to conferencing environments. In particular, this application relates to audio reinforcement and distributed call processing using daisy-chained units in a conferencing environment.

BACKGROUND

In conferencing environments, such as boardrooms, video conferencing settings, and the like, one or more microphones are used to capture sound from multiple audio sources. The audio sources may include in-room human speakers, and in some cases, loudspeakers for playing audio received from human speakers that are not in the room, for example. The captured sound may be disseminated to an audience through loudspeakers in the environment, a telecast, a webcast, telephony, etc. The types of microphones and their placement in a particular conferencing environment may depend on the locations of the audio sources, the loudspeakers, physical space requirements, aesthetics, room layout, and/or other considerations. For example, in some environments, the microphones may be placed on a table or lectern near the audio sources. In other environments, the microphones may be mounted overhead to capture the sound from the entire room, for example.

Some conventional conferencing systems include a single conferencing device or other hardware unit comprising one or more microphone(s) for capturing sound from near-end audio sources (e.g., human speakers) and a loudspeaker for playing sound received from far-end audio sources. In-room conference participants gather around the single conferencing device to speak into the microphone(s) and to hear far-end audio through the loudspeaker. In some larger conferencing spaces (e.g., a large boardroom), two or more conferencing devices may be electrically connected to each other but placed at different locations in the room or on the table, to help capture near-end audio sources spread out about the room and broadcast any far-end audio throughout the conferencing space.

In the case of multiple conferencing devices, either a remote server or one of the conferencing devices is typically assigned as the primary device for processing all near-end audio signals for transmission to the far-end, as well as being the source of all far-end audio signals included in the conference. For example, the primary device may be configured to receive near-end audio, or microphone, signals from each of the conferencing devices, mix the received signals together to generate a single mixed microphone signal, and then send the mixed microphone signal back to each of the conferencing devices for transmission to the far-end audio sources connected thereto. Likewise, the primary device may also receive audio signals from each far-end audio source connected thereto, mix the received signals together to generate a single far-end audio signal, and then send the mixed far-end signal to each of the conferencing devices for playback via the corresponding loudspeakers. Such centralized audio processing techniques limit the expandability of conferencing systems to cover more area and more in-room and/or remote users. For example, many conventional conferencing systems may require substantial re-configuring of its components in order to add more conferencing devices and/or far-end audio sources to the system.

Another drawback of conventional conferencing systems is that they do not facilitate audibility of local near-end audio for in-room listeners that are located far away from, or on an opposite side of the room than, the speaker. Typically, only the far end audio signals are broadcast by the loudspeaker of each conferencing device because broadcasting the near-end audio through the loudspeakers may be perceived as too loud or irritating, especially for the in-room listeners that are close enough to the speaker to hear the local audio first hand.

Accordingly, there is still a need for techniques that can address these concerns, for example, by enhancing near-end audio intelligibility for in-room participants and allowing for easy expandability, or downscaling, as the spatial needs change for a conferencing environment.

SUMMARY

The invention is intended to solve the above-noted problems by providing systems and methods that are designed to, among other things: (1) enhance audibility of all near-end audio, regardless of the listener's location within the conferencing space relative to the speaker, and (2) easily accommodate additional audio sources in an expanding conferencing space.

One example embodiment comprises a method of processing a plurality of audio signals associated with a conferencing environment comprising a plurality of conferencing devices connected in a daisy-chain configuration, using a first one of the conferencing devices. The first conferencing device comprises at least one microphone, at least one loudspeaker, at least one processor, one or more external communication ports for connecting to one or more external communication devices, and a pair of local connection ports for communicatively connecting to at least one other conferencing device. The method comprises receiving one or more auxiliary mixed microphone signals from at least one of the local connection ports, each of the one or more auxiliary mixed microphone signals comprising a mix of microphone signals captured by a respective one of the other conferencing devices; determining, using at least one processor, a gain adjustment value for each auxiliary mixed microphone signal based on a position of the other conferencing device that captured the signal, relative to a position of the first conferencing device within the daisy-chain configuration; adjusting, using at least one processor, a gain value for each auxiliary mixed microphone signal based on the corresponding gain adjustment value; generating, using at least one processor, a loudspeaker output signal from the one or more gain-adjusted auxiliary mixed microphone signals; and providing the loudspeaker output signal to the at least one loudspeaker of the first conferencing device Another example embodiment comprises a conferencing device for communicatively coupling to one or more other conferencing devices in a daisy-chain configuration. The conferencing device comprises a pair of local connection ports configured for communicatively connecting to at least one of the one or more other conferencing devices, at least one of the local connection ports being further configured to receive one or more auxiliary mixed microphone signals from the one or more other conferencing devices, wherein each auxiliary mixed microphone signal comprises a mix of microphone signals captured by a respective one of the other conferencing devices. The conferencing device also comprises one or more processors configured to: determine a gain adjustment value for each auxiliary mixed microphone signal based on a position of the other conferencing device that captured the signal, relative to a position of the conferencing device within the daisy-chain configuration, adjust a gain value for each auxiliary mixed microphone signal based on the corresponding gain adjustment value, and generate a loudspeaker signal from the one or more gain-adjusted auxiliary mixed microphone signals. The conferencing device further comprises at least one loudspeaker for outputting the loudspeaker signal.

Another example embodiment includes a conferencing system comprising a plurality of conferencing devices arranged in a daisy-chain configuration, each conferencing device comprising: a pair of local connection ports configured for communicatively connecting to at least one other conferencing device, one or more external communication ports configured to connect to one or more external communication devices, at least one microphone configured to provide one or more local microphone signals, at least one loudspeaker for outputting a loudspeaker signal, and one or more processors for processing received audio signals and providing the processed audio signals to one or more components of the conferencing device. The system further comprises one or more interconnects configured for coupling to the local connection ports of the plurality of conferencing devices. Each of the conferencing devices receives one or more auxiliary mixed microphone signals at one or more of the local connection ports and provides a local mixed microphone signal to at least one of the local connection ports, the local mixed microphone signal comprising a mix of microphone signals captured by its own microphones, and each auxiliary mixed microphone signal comprising a mix of microphone signals captured by the microphones of a respective one of the other conferencing devices. Moreover, the one or more processors of each conferencing device is configured to: determine a gain adjustment value for each auxiliary mixed microphone signal based on a position of the other conferencing device that captured the signal, relative to a position of the conferencing device within the daisy-chain configuration, adjust a gain value for each auxiliary mixed microphone signal based on the corresponding gain adjustment value, and generate the loudspeaker signal from the one or more gain-adjusted auxiliary mixed microphone signals.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION

Figure 1:
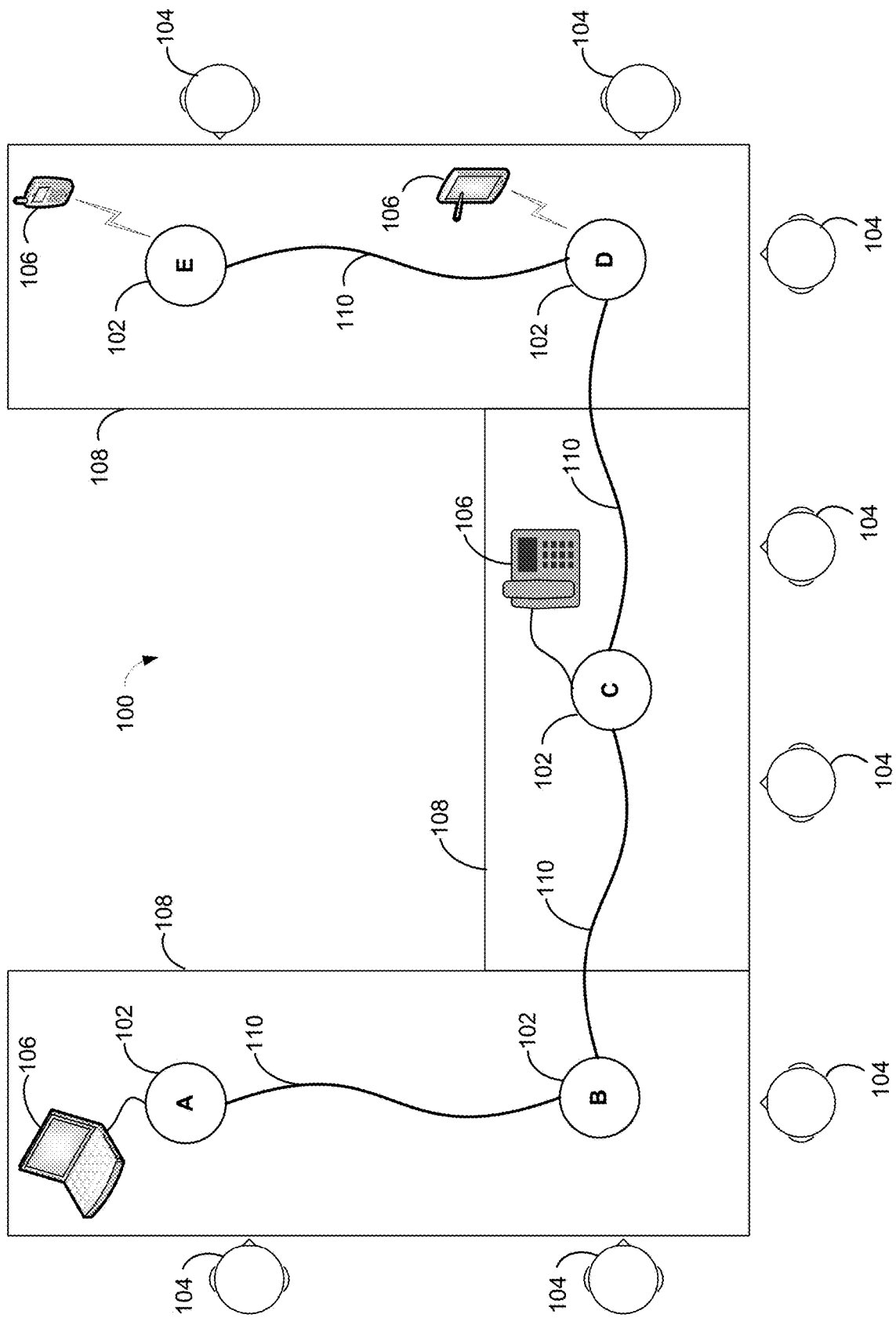
FIG. 1 is a schematic representation of an exemplary conferencing environment including multiple near-end audio sources, multiple far-end audio sources, and a number of spatially-distributed conferencing devices, in accordance with some embodiments.

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

It should also be noted that connections between the components shown in FIGS. 1-4 are intended to depict the potential flow of control signals, audio signals, and/or other signals over wired and/or wireless communication links. Such signals may be in digital and/or analog formats.

Systems, devices, and methods are provided herein for a conferencing solution that utilizes, among others, daisy-chaining, matrix mixing, and voice lifting techniques to provide a unified call experience across multiple audio sources, distributed audio processing across all conferencing devices, enable a given conferencing system to easily expand as needed (e.g., to cover larger areas and/or more call participants), and provide enhanced intelligibility of near-end audio, particularly in large conferencing spaces. In embodiments, the conferencing solution described herein utilizes a digital audio bus to connect multiple conferencing devices to each other in a daisy-chain configuration and efficiently distribute call processing loads across the multiple conferencing devices. The daisy-chained devices transmit audio signals between themselves, and also communicate with external devices associated with the remote participants, so that each call participant, whether present in the conferencing space or located remotely, can listen to all other participants to the conference call without hearing an echo or experiencing feedback. In addition, the conferencing solution alleviates the acoustical challenges of a large conferencing space by leveraging the position of each conferencing device within the daisy-chain configuration to enhance only the in-room sounds (e.g., voices) that need reinforcement.

More specifically, FIG. 1 illustrates an exemplary conferencing environment 100 in which a plurality of conferencing devices 102 are used to facilitate a conference call (e.g., teleconference, video conference, web conference, etc.) involving a plurality of in-room or near-end participants 104 (e.g., human speakers) and one or more remote or far-end participants (not shown) communicatively connected to the environment 100 through a plurality of external communication devices 106. The environment 100 may be, for example, a conference room, boardroom, meeting room, or any other type of conferencing space, and the conferencing devices 102 may be spatially distributed or dispersed around the conferencing space to capture speech or other sounds from a maximum number of the near-end participants 104. In the illustrated example, the near-end participants 104 are seated at chairs around one or more conference tables 108, and the conferencing devices 102 are placed at various locations on the tables 108 adjacent to one or more of the participants 104.

The external communication devices 106 may also be placed on the tables 108 or otherwise near the conferencing device 102 to which they are communicatively coupled, as shown in FIG. 1. The far-end participants to the conference call are considered "remote" because they are not present within the same room or conferencing space as the other, "in-room" participants 104 and are connected to the environment 100 only through the external communication devices 106. As an example, the remote participants may be nearby, such as, e.g., in another room within the same building, or far away from the conferencing space, such as, e.g., in another city, state, or country.

Other configurations and placements for the conferencing devices 102, in-room participants 104, external communication devices 106, tables 108, etc. are also contemplated and possible. For example, the in-room participants 104, or other near-end audio sources, may be standing or walking around the environment 100, instead of being seated at set positions. As another example, in some cases, the conferencing devices 102 may be placed on, or attached to, other surfaces in the conferencing environment, such as, e.g., a lectern, desk, wall, ceiling, etc.

According to embodiments, each conferencing device 102 includes one or more microphones for capturing near-end audio, such as, e.g., speech spoken by the near-end participants 104 present in the conferencing space, and at least one loudspeaker for disseminating, to the near-end participants 104, far-end audio received from the external communication devices 106, such as, e.g., speech or other sounds produced by the remote participants present at the other end of the conference call. The loudspeaker of each conferencing device 102 also outputs a gain-adjusted mix of near-end audio signals received from other conferencing devices 102, so that the sounds generated by near-end participants located further away from the conferencing device 102 can be heard more clearly or intelligibly by the near-end participants located adjacent to that device 102, as described in more detail herein.

To facilitate these and other functionalities, each conferencing device 102 may be coupled to at least one other conferencing device 102 in series, so as to form a daisy-chain configuration for sharing both near-end and far-end audio signals with each other, as shown in FIG. 1. In embodiments, each conferencing device includes a pair of local connection ports for connecting to one or more other conferencing devices using one or more cables 110 (also referred to herein as "interconnects"). For example, each conferencing device 102 may receive near-end audio signals from another conferencing device 102 that is positioned "upstream," or is connected to an input communication port of the receiving device 102 by one of the cables 110. In addition, each conferencing device 102 may transmit a mix of its own near-end audio signals (e.g., the audio signals captured by its own microphones) and the near-end audio signals received at its input port to yet another conferencing device 102 that is positioned "downstream," or is connected to an output communication port of the transmitting device 102 using another of the cables 110. Far-end audio signals received from the various external communication devices 106 may also be shared between the conferencing devices 102 in a similar manner, as described in more detail herein.

Upon receiving near-end and far-end audio signals, each conferencing device 102 may produce and output a loudspeaker signal that includes a mix of all far-end audio signals received from the various external communication devices 106, including those connected to other conferencing devices 102 within the daisy-chain configuration, and a gain-adjusted version of the near-end audio signals received from the other conferencing devices 102. In addition, each conferencing device 102 may provide, to each external communication device 106 connected thereto, an audio mix comprised of all near-end audio signals captured by the plurality of conferencing devices 102 within the daisy-chain configuration, as well as any far-end audio signals received from the other conferencing devices 102 and/or from the other external communication devices 106 connected to the same conferencing device 102, as described in more detail herein. The external communication devices 106 may transmit this audio mix to the remote participants that are present at the other end (e.g., far end) of the conference call, or connected to the call via the one or more far-end devices.

As shown in FIG. 1, each external communication device 106 may be connected to a respective one of the conferencing devices 102 through either a wired connection (e.g., telephone cable, Ethernet cable, audio cable, data cable (e.g., USB), etc.) or a wireless connection (e.g., Bluetooth®, WiFi, cellular, satellite, or other wireless network connection). Exemplary external communication devices 106 include, laptops or other personal computers; tablets, cellular phones, or other mobile devices; fixed or "landline" telephones; or any other communication device capable of transmitting audio signals between the remote participants and the in-room participants of the conferencing environment 100. As will be appreciated, in some cases, there may be no remote participants and therefore, no external communication devices 106 within the environment 100. Though not shown, in some cases, a given conferencing device 102 may be coupled to more than one external communication device 106. Other combinations or configurations for the devices 102 and 106 are also contemplated.

Figure 2:
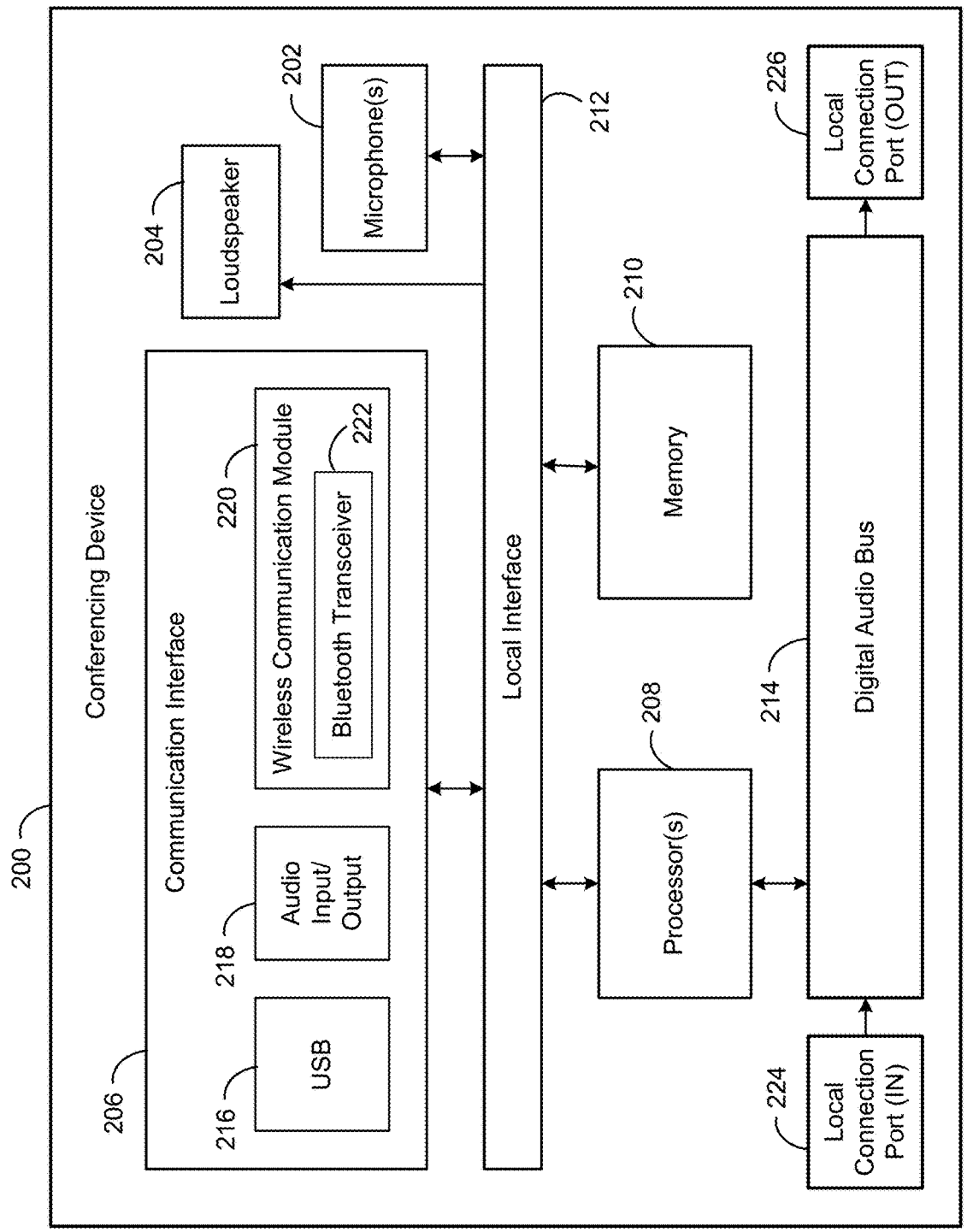
FIG. 2 is a block diagram of various components of an exemplary conferencing device, in accordance with some embodiments.

Referring additionally to FIG. 2, shown is a block diagram of an exemplary conferencing device 200 that may be included in the conferencing environment 100, for example, as one of the conferencing devices 102 shown in FIG. 1. The conferencing device 200 may be a bridge device, speakerphone, USB speaker device, or other similar electronic device for enable communications between participants located near (e.g., in room) and far (e.g., remote). As shown, the conferencing device 200 may comprise various components including, for example, one or more microphones 202, one or more loudspeakers 204, a communication interface 206, one or more processors 208, and a memory 210, all communicatively coupled by a local interface 212, such as a system bus, network, or other connection mechanism. In embodiments, the conferencing device 200 may use the communication interface 206 to establish wired or wireless communication with one or more external communication devices (e.g., external communication devices 106 of FIG. 1), each of which may be communicatively connecting to one or more remote or far-end participants via an external network (e.g., voice over IP (VOIP), telephone network, local area network, Bluetooth, Internet, etc.). The conferencing device 200 may further include a digital audio bus 214 for locally connecting the conference device 200 to other conferencing devices within the environment 100 (e.g., conferencing devices 102), as described in more detail herein.

The one or more microphones 202 may detect and capture sound from the in-room or near end audio sources of the conferencing environment 100 (e.g., in-room participants 104) and convert the sound to an analog (or digital) audio signal. The microphone(s) 202 may be included in the conferencing device 200, as shown, and/or may be connected to the conferencing device 200 via a wired connection (e.g., Ethernet cable, USB cable, etc.) or a wireless connection (e.g., Bluetooth®, WiFi, etc.). The microphone(s) 202 may be configurable to form multiple polar patterns and/or corresponding steering angles in order to optimally detect and capture sound from the in-room audio sources. The polar patterns that can be formed by the microphone(s) 202 may include omnidirectional, cardioid, subcardioid, supercardioid, hypercardioid, bidirectional, and/or toroidal. In some cases, each microphone 202 comprises multiple unidirectional microphone cartridges. For example, the unidirectional microphone cartridges may each be an electret condenser microphone cartridge with a cardioid polar pattern and a rear port. In other cases, the microphone cartridges may have other polar patterns and/or may be dynamic microphones, ribbon microphones, piezoelectric microphones, MEMS microphones, and/or other types of microphones. In some embodiments, the desired polar patterns and/or desired steering angles formed by the microphone(s) 202 can be configured by a user through software. In such cases, an electronic device may be in communication with the conferencing device 200 to control such parameters. The electronic device may include, for example, a smartphone, tablet computer, laptop computer, desktop computer, etc. In some embodiments, the conferencing device 200 may include controls to adjust parameters of the microphones, such as polar pattern, gain, noise suppression, muting, frequency response, etc.

The one or more processors 208 may be configured, e.g., using software stored in the memory 210, to process the analog audio signals generated by the microphone(s) 202 and ultimately generate one or more digital audio output signals. In one embodiment, the processor(s) 208 may include two or more separate processors, for example, at least one for consolidating and formatting the individual audio signals (e.g., audio processor) and at least one for implementing digital signal processing (DSP) functionality (e.g., DSP processor). The conferencing device 200 may also include other components (not shown), such as one or more analog to digital converters, codecs, encryption chips, audio mixers, etc., for processing and/or converting the analog audio signals to digital form (e.g., microphone signals, telephone signals, etc.). The digital audio output signals may conform to the Dante standard for transmitting audio over Ethernet, in some embodiments, or may conform to another standard. One or more polar patterns may also be formed by the one or more processors 208 from the audio signals generated by the microphone(s) 202, and the processor(s) 208 may generate a digital audio output signal corresponding to each of the polar patterns. In other embodiments, the microphone(s) 202 may output analog audio signals so that other components and devices (e.g., processors, mixers, recorders, amplifiers, etc.) external to the conferencing device 200 can process the analog audio signals captured by the microphone(s) 202.

The loudspeaker 204 may comprise one or more speakers or audio reproduction devices for playing out loud audio signals received from far-end audio sources via the communication interface 206 and/or other audio signals received from the processor(s) 208 via the local interface 212. The far-end audio sources may be, for example, the external communication devices 106 shown in FIG. 1, or any other device configured to provide speech or other sounds produced by human speakers that are not physically present in the conferencing environment 100 (e.g., the remote or far-end participants). The loudspeaker 204 may also receive, from the processor(s) 208 via the local interface 212, one or more near-end audio signals received from other conferencing devices 102 within the conferencing environment 100. In some cases, the near-end audio signals output by the loudspeaker 204 are the original analog audio signals captured by the microphone(s) of the other conferencing devices 102. In other cases, the near-end audio signals are the digital audio output signals converted back to analog audio signals so they can be heard over the loudspeaker 204. According to embodiments, the loudspeaker 204 may be included in the conferencing device 200, as shown, and/or may be connected to the conferencing device 200 via a wired connection (e.g., Ethernet cable, USB cable, etc.) or a wireless connection (e.g., Bluetooth®, WiFi, etc.).

The communications interface 206 comprises one or more external communication ports, such as, e.g., a transceiver, data port (e.g., input/output data port), parallel data port, serial data port, audio port (e.g., audio input/output port), or other communications device, to facilitate communications between the conferencing device 200 and one or more other devices, systems, or networks according to one or more protocols, including, for example, the external communication devices 106 shown in FIG. 1. As shown in FIG. 2, the communications interface 206 may include one or more wired communications interfaces, such as, e.g., a Universal Serial Bus (USB) port 216 (e.g., a USB-C port, a standard USB port, a mini-USB port, a micro-USB port, etc.), an audio input/output port 218 (e.g., a 3.5 mm audio port, a telephone jack, etc.), an Ethernet jack or other network interface (not shown), a high-definition serial-digital-interface (HD-SDI) (not shown), etc. As also shown, the external communication ports of the communications interface 206 may also include a wireless communication module 220. The wireless communication module 220 may include receivers, transmitters, transceivers, ports, modems, and/or other communication devices for facilitating wireless network communications according to certain protocols. For example, the wireless communication module 220 may include a Bluetooth® transceiver 222, a cellular transceiver (not shown), a wide area network transceiver (e.g., WiFi, WLAN, WWAN, etc.) (not shown), or the like.

The local interface 212 may include a data bus comprising one or more wires, traces, or other connection mechanisms for communicatively coupling the one or more processors 208, memory 210, communication interface 206, loudspeaker 204, one or more microphones 202, and/or any other applicable component of the conferencing device 200.

The digital audio bus 214 may be coupled to first and second local connection ports 224 and 226, as well as the one or more processors 208 and may be configured to facilitate communication between the ports 224, 226 and the processor(s) 208. For example, the digital audio bus 214 may receive incoming signals from one or more of the ports 224, 226 and provide the incoming signals to the processor(s) 208. The incoming signals may have been transmitted to the conferencing device 200 by one or more other conferencing devices. In addition, the digital audio bus 214 may receive outgoing signals from the processor(s) 208 and provide the outgoing signals to one or more of the ports 224 and 226 for transmission to one or more other conferencing devices. In some embodiments, the digital audio bus 214 may include a processor (e.g., microprocessor) and a memory (e.g., electronic memory) to facilitate the signal flow there through and perform other operations, as described herein.

The digital audio bus 214 may also be configured to connect the conferencing device 200 in series with one or more other conferencing devices to form a daisy-chained configuration (e.g., as shown by conferencing devices 102 in FIG. 1). For example, the digital audio bus 214 may have one outlet or connection interface coupled to the first local connection port 224 and another outlet coupled to the second local connection port 226. Each bus outlet may have a specific designation (such as, e.g., "IN" or "OUT"), such that the outlets, and therefore, the local connection ports 224 and 226 coupled thereto, are not interchangeable. In embodiments, a daisy-chain is formed by connecting the second local connection port 226 (e.g., "OUT") of each conferencing device to the first connection port 224 (e.g., "IN") of another conferencing device until all of the conferencing devices within the conferencing space have been connected to at least one other conferencing device. Other techniques for creating a daisy-chain configuration are also contemplated.

As shown in FIG. 1, once these connections are made, the conferencing devices 102 located at the beginning (e.g., device A) and end (e.g., device E) of the daisy chain may be physically connected to only one other conferencing device 102, while each of the remaining, intermediate conferencing devices 102 (e.g., devices B, C, D) may be physically connected to two other conferencing devices 102 (e.g., the immediately preceding device and the immediate succeeding device). More specifically, the end device E may have a connection at its first connection port 224 (to device D) but not at its second connection port 226, and the beginning device A may have a connection at its second connection port 226 (to device B) but not at its first connection port 224.

The flow of audio signals, and/or other signals, between the conferencing devices 102 within the daisy-chain configuration may be determined by the manner and/or order in which the devices 102 are connected. For example, in some cases, signals and/or information may flow forward or front to end, e.g., from device A to device B, to device C, and so on, until reaching device E. In other cases, for example, the signal flow may be reversed, so that device E provides audio signals to device D, and so on until the signals reach device A at the beginning of the daisy chain. In some embodiments, a bidirectional signal flow may be preferred, so that the audio signals produced by or received at each conferencing device 200 can be shared with each other conferencing device.

In some embodiments, the digital audio bus 214 is able to determine a position of the conferencing device 200 within the daisy-chain configuration upon identifying the connections, or lack thereof, to other conferencing devices 102 at the local connection ports 224 and 226. For example, if the second connection port 226 of the conferencing device 200 is connected to another conferencing device 102, but the first connection port 224 of said device 200 is free or unconnected, then the conferencing device 200 may be deemed to be in a first or beginning position of the daisy-chain configuration. As another example, if the first connection port 224 of the conferencing device 200 is connected to another conferencing device 102, but the second connection port 226 of said device 200 is free or unconnected, then the conferencing device 200 may be deemed to be in a last or end position of the daisy-chain configuration.

Once one of the conferencing devices 102 identifies itself as being in the first daisy-chain position, an automatic serial self-discovery process may continue by enumerating, or sequentially assigning, positions to the remaining conferencing devices (e.g., second, third, fourth, etc.) based on the serial connections between the devices. For example, referring again to FIG. 1, the digital audio bus 214 of device A may send a signal to the digital audio bus 214 of device B indicating that device A is in the first position. Upon learning that its first connection port 224 is connected to the conferencing device in the first position, the digital audio bus 214 of device B may automatically determine its daisy chain position as being the second position and may send a signal to the digital audio bus 214 of device C indicating the same. This self-discovery process may continue until the last conferencing device (e.g., device E) is assigned a position with the daisy chain and/or is identified as being the end of the daisy-chain.

In embodiments, the self-discovery process may be automatically performed every time the conferencing devices 102 are powered on or restarted, without requiring user intervention. In some embodiments, the self-discovery process may also be dynamically performed, for example, every time the daisy-chain configuration is changed by moving, adding, or removing one of the conferencing devices, without requiring user intervention. In such cases, once the daisy-chain is reconfigured, a power cycle may be initiated (e.g., by turning each of the conferencing devices 102 off and on), which may automatically launch a new self-discovery cycle.

Each of the conferencing devices 102 may be assigned a unique identifier or node name that is used to identify the conferencing device 102 to the other devices 102 within the conferencing environment 100. In some cases, each device's self-assigned daisy-chain position, whether numerical (e.g., 1, 2, 3, etc.) or textual (e.g., A, B, C, etc.), may also serve as the unique identifier for that device 102. In other cases, each daisy-chain position may be associated with a separate node name, or other identifying information, and said node name or identifier may be assigned to the conferencing device 102 located at the corresponding position.

In some embodiments, the digital audio bus 214 of the conferencing device 200 may be configured to provide or create a multichannel, time-division multiplexed link with each of the other conferencing devices connected thereto (or more specifically, the digital audio buses included therein). For example, the digital audio bus 214 may be a high bandwidth digital bus capable of transporting bidirectional synchronous data, such as, e.g., digital audio data, together with control data, clock, and, in some cases, power, over a single cable, such as, e.g., a CAT-5 cable, Ethernet cable, or other 2-wire, twisted pair cable (e.g., cable 110 in FIG. 1). The digital audio bus 214 may be configured to support a direct point-to-point connection between the conferencing device 200 and each other conferencing device coupled thereto, and this interconnection may allow multiple, daisy-chained conferencing devices (e.g., devices 102) at different locations to contribute to or consume the time-division-multiplexed channel content being transported between said devices via their digital audio buses. In addition, the bidirectional feature of the multi-channel link may allow each digital audio bus 214 to accept both upstream and downstream signal flows, or have two separate channels for handling the same, which may allow for simultaneous sharing of information across all devices 102 in the daisy-chain. In some cases, the digital audio bus 214 may be configured to use time-slots to facilitate the bidirectional signal flow and enable simultaneous access to all information loaded onto the digital audio bus 214.

In some embodiments, the digital audio buses 214 of the daisy-chained conferencing devices 102 may be connected to each other in a line topology (also known as "linear bus topology"), which may be "created" only after two or more devices 102 are coupled to each other. In such cases, each of the conferencing devices 102 may be configurable as either a master or slave device for this network topology. In one example embodiment, the digital audio bus 214 of the conferencing device 102 that is identified as being in the first position of the daisy-chain configuration (e.g., device A in FIG. 1) may be assigned as the master device, and all other conferencing devices 102 within the daisy-chain may be assigned as slave devices. In another example embodiment, any one of the digital audio buses 214 on the line topology may be assigned as the master device, and may always remain the master device despite its position in the daisy-chain configuration. In such cases, the remaining digital audio buses 214 may be assigned as slave devices regardless of their final position in the daisy-chain configuration.

In general, configuring the network of conferencing devices 102 to have a line topology can increase overall system integrity, robustness, and efficiency. For example, if one connection (e.g., one of the devices 102 or interconnects 110) within the daisy-chain configuration is compromised, only the conferencing devices 102 situated downstream from the faulty connection may be impacted, while the upstream devices 102 may continue to operate as before. Also, after the initial set-up of master-slave assignments, the digital audio bus 214 of each conferencing device 102 may not require further processor intervention to manage normal bus operation. Moreover, the line topology network allows the conferencing devices 102 to be quickly and easily added to, removed from, or moved around within the daisy chain. In other embodiments, the conferencing devices 102 may be connected using other network topologies, such as, e.g., a ring topology, a star topology, a mesh topology, a hybrid topology, etc.

The local communication ports 224 and 226 may be any type of port or interface configured to receive, or be coupled to, an interconnect or cable (such as, e.g., the cables 110 shown in FIG. 1) for operatively connecting the conferencing device 200 to other conferencing devices (e.g., conferencing devices 102). As an example, the local communication ports 224 and 226 may be configured to receive a CAT-5 cable, Ethernet, or other 2-wire, twisted pair cable. In some embodiments, the local connection ports 224 and 226 may form part of the digital audio bus 214. For example, the ports 224 and 226 may be included on or otherwise coupled to a transceiver chip that embodies the digital audio bus 214. In other embodiments, the local connection ports 224 and 226 may form part of the conferencing device 200. In such cases, the ports 224 and 226 may be physically separated from the digital audio bus 214 but may be communicatively coupled to the digital audio bus 214 during assembly or manufacture of the conferencing device 200.

In embodiments, the one or more processors 208 may include a general purpose processor (e.g., a microprocessor) and/or a special purpose processor (e.g., a digital signal processor (DSP)). The processor(s) 208 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs).

Memory 210 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, memory 210 includes multiple kinds of memory, particularly volatile memory and non-volatile memory. The memory 210 may be computer readable media on which one or more sets of instructions, such as software for operating the methods of the present disclosure, can be embedded. The instructions may embody methods 500 and 600 shown in FIGS. 5 and 6, or any other methods or logic described herein. The instructions may reside completely, or at least partially, within any one or more of the memory 210, the computer readable medium, and/or within the processor 208 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

It should be understood that examples disclosed herein may refer to conferencing devices having components that may or may not be physically located in proximity to each other. Certain embodiments may take the form of cloud based systems or devices, and for those embodiments, the term "conferencing device" should be understood to include distributed systems and devices (such as those based on the cloud), as well as software, firmware, and other components configured to carry out one or more of the functions described herein. Further, as noted above, one or more features of the conferencing device 200 may be physically remote (e.g., a standalone microphone) and may be communicatively coupled to the conferencing device 200, via an appropriate communication interface, for example.

Figure 3:
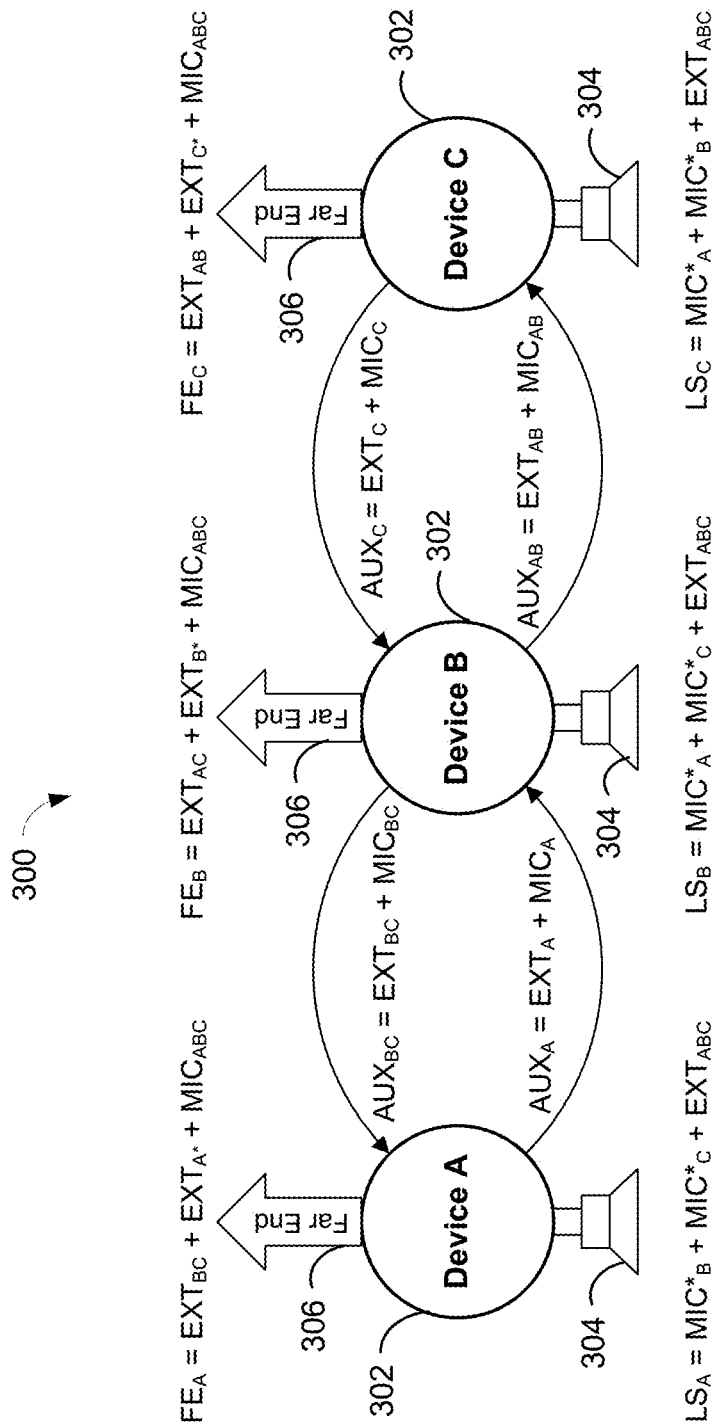
FIG. 3 is a schematic representation of exemplary output signals produced by conferencing devices in an exemplary conferencing system, in accordance with some embodiments.

FIG. 3 is a schematic representation of exemplary output signals produced by conferencing devices 302 in an exemplary conferencing system 300 during a conference call, video conference, meeting, webinar, or the like, in accordance with embodiments. The conferencing system 300 may be set up in a room or space similar to the conferencing environment 100 shown in FIG. 1. The conferencing devices 302 may be arranged in a daisy-chain configuration using the techniques described herein and may be configured to pick up near-end audio and disseminate far-end audio throughout the conferencing space, similar to the arrangement shown in FIG. 1. While FIG. 3 shows three conferencing devices 302 in the conferencing system 300, it should be understood that more (or fewer) devices 302 may be included in other embodiments.

In some embodiments, each of the conferencing devices 302 shown in FIG. 3 may be similar to the conferencing device 200 shown in FIG. 2. For example, each conferencing device 302 may include one or more microphones (such as, e.g., microphone(s) 202 shown in FIG. 2) for picking up or capturing speech or other sounds produced by near-end audio sources (e.g., in-room participants 104 shown in FIG. 1). As shown, each of the conferencing devices 302 may also include a loudspeaker 304 (such as, e.g., loudspeaker 204 of FIG. 2) for outputting audio signals (e.g., LSO to near-end or in-room participants seated near the conferencing device 302, or otherwise within audible range of the same. The conferencing devices 302 may further include a communication interface 306 (such as, e.g., communication interface 206 shown in FIG. 2) for outputting audio signals (e.g., $FE_n$) to, and/or receiving audio signals from (e.g., $EXT_n$), one or more external communication devices coupled to the conferencing device 302 (such as, e.g., external communication devices 106 shown in FIG. 1). In embodiments, each conferencing device 302 may also be configured to operate internally according to the functional block diagram of FIG. 4, as described in more detail herein.

The external or far-end audio signals received via the communication interface 306 may represent speech or other sounds generated by far-end or remote participants to the conference call or meeting. As an example, each external communication device may be communicatively coupled, via a wired or wireless connection, to one or more remote devices (e.g., telephone, cell phone, tablet, laptop, desktop computer, etc.) being used by one or more far-end participants to connect to and participate in the meeting. In embodiments, the communication interface 306 may include one or more external communication ports (such as, e.g., wireless transceiver 222, audio input/output port 218, and USB port 216 of FIG. 2) capable of connecting to the one or more external communication devices (e.g., laptop, cellphone, telephone, tablet, or the like) using a wired or wireless connection. Thus, the external audio signals may be generated by a remote device and transmitted to the external communication device that is communicatively coupled thereto, and the external communication device may provide the received external audio signal to the conferencing device 302 through the communications interface 306.

In embodiments, the conferencing system 300 may be configured to output to each far-end device, via the communication interface 306 and the external communication device connected thereto, all near-end audio (e.g., $MIC_{n-1}$, $MIC_n$, $MIC_{n+1}$, etc.) and all far-end audio associated with the conference call, except for the far-end audio signals received from that far-end device (e.g., $EXT_{n-1}$, $EXT_{n*}$, $EXT_{n+1}$). In addition, the conferencing system 300 may be configured to output to each near-end participant, via the loudspeaker 304 of the nearest conferencing device 302, all far-end audio received from the external communication devices connected to the conference call (e.g., $EXT_{n-1}$, $EXT_n$, $EXT_{n+1}$, etc.), as well as the near-end audio captured by the microphones of the other conferencing devices 302 within the room (e.g., $MIC_{n-1}$, $MIC_{n+1}$, etc.). As a result, each participant to the conference call or meeting may hear the contributions of each other participant to the meeting, regardless of whether the participants are at the near-end or far-end of the call.

In exemplary embodiments, dissemination of audio signals in this manner may be achieved by leveraging the daisy-chain configuration of the conferencing system 300 to transmit audio signals from one conferencing device 302 to the next conferencing device 302, until all audio signals have been received by all devices 302. For example, like the conferencing devices 102 shown in FIG. 1, the conferencing devices 302 may be connected in series by using cables (e.g., cables 110 shown in FIG. 1) to couple one or more local connection ports (such as, e.g., the local connection ports 224 and 226 of FIG. 2) of each conferencing device 302 to one or more local connection ports of at least one other conferencing device 302. In such cases, the direction of signal flow between the conferencing devices 302, and the content of said signals, may be determined by the order and manner in which the devices 302 are connected to each other.

In some embodiments, the connections between the conferencing devices 302 may be leveraged to form a digital audio bus (such as, e.g., the digital audio bus 214 of FIG. 2) across the connected devices 302. Audio signals, and/or other information, may be exchanged between the conferencing devices 302 via the cables connected there between and over one or more audio and/or data channels of the digital audio bus. For example, the digital audio bus may be configured to create a multichannel, time-division-multiplexed (TDM) link between and across the conferencing devices 302 that is capable of handling upstream and downstream signal traffic simultaneously. In such cases, each of the conferencing devices 302 may be assigned one or more TDM slots within the multi-channel link for sharing content produced by or received at that device 302, and the other conferencing devices 302 may be able to simultaneously access the shared content through the digital audio bus. As will be appreciated, other techniques may be used to share content between the plurality of daisy-chained conferencing devices 302.

As shown in FIG. 3, the conferencing device 302 that is in a first position of the daisy-chain configuration (e.g., device A) may have a first connection port (e.g., first port 224 of FIG. 2) that is unconnected or open, while a second connection port (e.g., second port 226 of FIG. 2) is connected to the conferencing device 302 that is in a second daisy-chain position (e.g., device B). Likewise, the conferencing device 302 that is in an end position of the daisy-chain configuration (e.g., device C) may have its first connection port coupled to the conferencing device 302 that is in the immediately preceding position (e.g., device B), while the second connection port of the end device may remain unconnected or open. Further, each of the intermediate devices within the daisy-chain configuration (e.g., device B) may have its first connection port connected to the conferencing device 302 that is in the immediately preceding position (e.g., device A) and may have its second connection port connected to the conferencing device 302 that is in the immediately succeeding position (e.g., device C).

In some embodiments, audio and/or other signals may flow sequentially through the daisy-chain configuration from the first of the conferencing devices 302 to the last of the conferencing devices 302, for example, using a downstream channel. In some embodiments, signals may also flow in the reverse direction, from the last of the conferencing devices 302 to the first of the conferencing devices 302, for example, using an upstream channel. The content of the signals output by each conferencing device 302 may include a local audio output signal (e.g., $AUX_n$) generated based on the near-end audio captured by the microphones of that device 302 (e.g., $MIC_n$) and the far-end audio received via the communications interface 306 of that device 302 (e.g., $EXT_n$), along with any auxiliary audio output signals received at that device 302, via the multichannel link, from one or more of the conferencing devices 302 coupled thereto (e.g., $AUX_{n-1}$, $AUX_{n+1}$, etc.). In this manner, each conferencing device 302 may receive the audio signals captured or received by each other conferencing device 302 within the conferencing system 300.

More specifically, in the illustrated embodiment, conferencing device A is in a first position of the daisy-chain configuration and is connected to device B. Accordingly, conferencing device A may be configured to communicate (e.g., transmit and/or receive) using only the second connection port that is coupled to device B. As shown in FIG. 3, conferencing device A may be configured to generate, for output to device B only, a local audio output signal (e.g., $AUX_A$) comprising a near-end audio mix, which includes the microphone signals captured by the microphones of device A (e.g., $MIC_A$), and a far-end audio mix, which includes the external audio signals received from the external communication device(s) coupled to the communication interface 306 of device A (e.g., $EXT_A$).

Conferencing device B, on the other hand, is in a second or middle position and therefore, is connected to both device A, via a first cable coupled to the first connection port of device B, and conferencing device C, via a second cable coupled to the second connection port of device B. As shown in FIG. 3, conferencing device B may be configured to generate, for output to the other conferencing devices A and C, a local audio output signal (e.g., $AUX_B$) comprising a near-end audio mix, which includes the microphone signals captured by its own microphones (e.g., $MIC_B$), and a far-end audio mix, which includes the external audio signals received from the external communication device(s) coupled to the communication interface 306 of device B (e.g., $EXT_B$). In addition, conferencing device B may be configured to receive the auxiliary audio output signal of device A (e.g., $AUX_A$), via the first cable, and output or provide the received signal to conferencing device C via the second cable. For example, as shown in FIG. 3, the auxiliary audio output signal received from device A may be combined with the local audio output signal generated by device B to create a mixed audio output signal (e.g., $AUX_{AB}$) for transmission to device C.

As also shown in FIG. 3, conferencing device C is in a third or end position of the daisy-chain and therefore, is connected to device B only, via the second cable being coupled to its first connection port. In embodiments, conferencing device C may utilize the multi-channel link provided between the digital audio bus of device C and the digital audio bus of device B, via the second cable, to output or provide audio signals back to device B. For example, conferencing device C may be configured to generate, for output to device B, a local audio output signal (e.g., $AUX_C$) comprising a near-end audio mix, which includes the microphone signals captured by the microphones of device C (e.g., $MIC_C$), and a far-end audio mix, which includes the external audio signals received from the external communication device(s) coupled to the communication interface of device C (e.g., $EXT_C$).

As also shown in FIG. 3, conferencing device B may, in turn, provide the audio output signal received from device C (e.g., $AUX_C$) to conferencing device A, using the multi-channel link created between the digital audio buses of the two devices B and A. For example, the auxiliary audio output signal from device C (e.g., $AUX_C$) and the local audio output signal generated by device B (e.g., $AUX_B$) may be combined into a mixed audio output signal (e.g., $AUX_{BC}$) for transmission to device A. In this manner, the near-end signals captured by, and/or the far-end signals received at, the end device C may be shared with each of the other conferencing devices A and B within the daisy-chain configuration.

Other techniques for transmitting the audio output signals generated by each conferencing device 302 to every other conferencing device 302 within the system 300 are also contemplated. For example, in other embodiments, the conferencing devices 302 may be coupled to each other in a ring configuration wherein the second connection port of conferencing device C is coupled to the first connection port of conferencing device A. In such cases, the audio output signal generated by device C (e.g., $AUX_C$) may be transmitted to device A directly, and conferencing device A may be configured to forward the $AUX_C$ signal to device B along with the $AUX_A$ signal.

In other example embodiments, the audio output signals generated by each of the devices 302 may be individually placed on the digital audio bus using the TDM slot assigned to each device 302 and may be accessible to all devices 302 within the system 300, as described herein. In such cases, each device 302 can select, ad-hoc, which signals or sub-mixes to retrieve from the digital audio bus and create their own audio mixes internally. For example, instead of receiving a mixed audio output signal $AUX_{BC}$ from device B, device A may individually retrieve the external audio output signal $EXT_B$ generated by device B and the external audio output signal $EXT_C$ generated by device C and create a mixed external audio output signal $EXT_{BC}$ for output to the far-end. Likewise, device A may individually retrieve microphone signals $MIC_B$ and $MIC_C$ and combine those signals with its own microphone signal $MIC_A$ to generate the global mixed microphone signal $MIC_{ABC}$.

As also shown in FIG. 3, each conferencing device 302 may also be configured to output a far-end audio output signal (e.g., $FE_n$), via the communication interface 306 included therein, to each of the one or more external communication devices coupled to that device 302. Each external communication device may, in turn, provide the received far-end output signal (e.g., $FE_n$) to the one or more far-end devices communicatively coupled to it. In embodiments, the far-end audio output signal (e.g., $FE_n$) provided to each external communication device may include a common global near-end audio mix (e.g., $MIC_{Global}$) that includes the near-end audio captured by all microphones within the conferencing system 300, but a different external audio mix depending on the specific external communication device and/or far-end device that is ultimately receiving the signal. For example, each conferencing device 302 may be configured to generate, for each far-end device connected to the conference call via the communication interface 306 of that device 302, an external audio mix that includes the external audio signals received from each of the other far-end devices connected to the conference call via the same communication interface 306 (e.g., $EXT_{n*}$), as well as the far-end audio mix received from each of the other conferencing devices 302 within the daisy-chained system 300 (e.g., $EXT_{n-1}$, $EXT_{n+1}$, etc.). In some embodiments, each conferencing device 302 may be configured to use matrix-mixing techniques to remove any redundant external audio signals, or those far-end signals that were contributed by the same device that is receiving the signal, from the external audio mix before outputting the far-end audio output signal (e.g., $FE_n$) to each external communication device.

For example, conferencing device A may be configured to output to each external communication device coupled to its communication interface a far-end audio output signal (e.g., $FE_A$) comprising a global near-end audio mix that includes the near-end audio signals captured by the microphones of all three devices A, B, and C (e.g., $MIC_{ABC}$) and an external audio mix that includes the far-end audio mix for conferencing devices B and C (e.g., $EXT_{BC}$) and the external audio signals received from each of the other far-end devices connected to the same external communication device and/or one of the other external communication devices coupled to the communication interface 306 of device A (e.g., $EXT_A*$). Similarly, conferencing device B may be configured to output to each external communication device coupled to its communication interface 306 a far-end audio output signal (e.g., $FE_B$) comprising the global near-end mix (e.g., $MIC_{ABC}$) and an external audio mix that includes the far-end audio mix for conferencing devices A and C (e.g., $EXT_{AC}$) and the external audio signals received from each of the other far-end devices connected to the same external communication device and/or one of the other external communication devices coupled to the communication interface 306 of device B (e.g., $EXT_B*$). Likewise, conferencing device C may be configured to output to each far-end device coupled to its communication interface 306 a far-end audio output signal (e.g., $FE_C$) comprising the global near-end audio mix (e.g., $MIC_{ABC}$) and an external audio mix that includes the far-end audio mix for conferencing devices A and B (e.g., $EXT_{AB}$) and the external audio signals received from each of the other far-end devices connected to the same external communication device and/or one of the other external communication devices coupled to the communication interface 306 of device C (e.g., $EXT_C*$).

As will be appreciated, if one of the conferencing devices 302 is coupled to only one external communication device and that external communication device is connected to only one far-end device, then the external audio mix included in the far-end audio output signal (e.g., $FE_n$) will only include the far-end audio mix received from the other conferencing devices 302 (e.g., $EXT_{n-1}$, $EXT_{n+1}$, etc.). On the other hand, if the external communication device is connected to two or more far-end devices, then the conferencing device 302 may output two different far-end audio output signals, each comprising a different external audio mix tailored to the specific far-end receiving device. Also, if one of the conferencing devices 302 is not coupled to any external communication devices via its communication interface 306, then a far-end audio output signal may not be generated by that device 302.

As also shown in FIG. 3, each conferencing device 302 may be configured to output a loudspeaker signal (e.g., $LS_n$) via its loudspeaker 304 to any near-end participants within audible range of the device 302. The loudspeaker signal (e.g., $LS_n$) generated by each conferencing device 302 may comprise a global far-end audio mix (e.g., $EXT_{Global}$) that includes all of the far-end audio signals received at the communication interfaces 306 of the conferencing devices 302 within the system 300, as well as a near-end audio mix comprising the near-end audio signals received from the other conferencing devices 302 (e.g., $MIC_{n-1}$, $MIC_{n+1}$, etc.).

In some embodiments, the near-end audio signals received from the other conferencing devices 302 may be gain-adjusted or otherwise modified based on a proximity to the receiving device 302 (e.g., MIC*n), so that distant voices are "lifted" or reinforced as compared to nearby voices until all voices or signals are played at a uniform signal level or strength, as described in more detail herein. For example, the near-end audio signals received from immediately adjacent conferencing devices 302 (e.g., $MIC_{n-1}$ or $MIC_{n+1}$) may be attenuated more than the near-end audio signals received from conferencing devices 302 that are further away from the receiving device 302 along the daisy-chain (e.g., $MIC_{n+2}$, $MIC_{n-2}$, $MIC_{n+3}$, $MIC_{n-3}$, etc.).

In the illustrated example, conferencing device A generates an audio signal for output by its loudspeaker 304 (e.g., $LS_A$) that comprises a global far-end audio mix (e.g., $EXT_{ABC}$), which includes a mix of the far end audio signals received from all of the external communication devices coupled to each of the conferencing devices A, B, and C, and a near-end audio mix, which includes a gain-adjusted version of the near-end audio signals captured by the microphone(s) of conferencing device B (e.g., $MIC*_B$) and a gain-adjusted version of the near-end audio signals captured by the microphone(s) of conferencing device C (e.g., $MIC*_C$). In some embodiments, the gain-adjustment may include substantially or completely attenuating the near-end audio signal received from device B (e.g., $MIC_B$) because conferencing device B may be close enough to device A that little or no gain adjustment is necessary to improve intelligibility. The gain-adjustment may also include amplifying the near-end audio signal received from device C (e.g., $MIC_C$), since device C may be far enough away from device A that a relative gain adjustment is required.

Similarly, conferencing device B generates a loudspeaker audio signal (e.g., $LS_B$) for output by its loudspeaker 304 that comprises the global far-end audio mix (e.g., $EXT_{ABC}$) and a near-end audio mix including a gain-adjusted version of the near-end audio signals captured by the microphone(s) of conferencing device A (e.g., $MIC*_A$) and a second gain-adjusted version of the near-end audio signals captured by the microphone(s) of conferencing device C (e.g., $MIC*_C$). In embodiments, the amount of gain adjustment applied to the near-end audio signals received from devices A and C (e.g., $MIC_A$ and $MIC_C$) may be the same or similar if the two devices A and C are generally equidistant from the middle device B. For example, in one embodiment, both near-end audio signals may be substantially or completely attenuated because both devices A and C are positioned close enough to the conferencing device B that little or no gain-adjustment is necessary.

Likewise, conferencing device C generates a loudspeaker audio signal (e.g., $LS_C$) for output by its loudspeaker 304 that comprises the global far-end audio mix (e.g., $EXT_{ABC}$) and a near-end audio mix that includes a second gain-adjusted version of the near-end audio signals captured by the microphone(s) of conferencing device A (e.g., $MIC*_A$) and a second gain-adjusted version of the near-end audio signals captured by the microphone(s) of conferencing device B (e.g., $MIC*_B$). In embodiments, the gain-adjustment may include substantially or completely attenuating the near-end audio signal received from device B (e.g., $MIC_B$), since conferencing device B may be close enough to device C that little or no gain adjustment is necessary. The gain-adjustment may also include amplifying the near-end audio signal received from device A (e.g., $MIC_A$), since device A may be far enough away from device C that a relative gain adjustment is required.

In cases where there are no remote participants to a meeting, none of the conferencing devices 302 may be coupled to an external communication device, and no far-end audio signals may be received at the communication interface 306 of each conferencing device 302. In such cases, the loudspeaker audio signal generated for each conferencing device 302 may comprise only gain-adjusted near-end audio signals received from the other conferencing devices 302 within the system 300. Also, the digital audio bus of each conferencing device 302 may be used to transmit only near-end audio signals between the daisy-chained devices 302. Gain-adjustment techniques may still be applied to the near-end audio signals before generating the loudspeaker signal, so that the voices of each participant in the meeting can be uniformly played or heard throughout the conferencing environment, especially in large board rooms or other expansive meeting spaces, for example.

Figure 4:
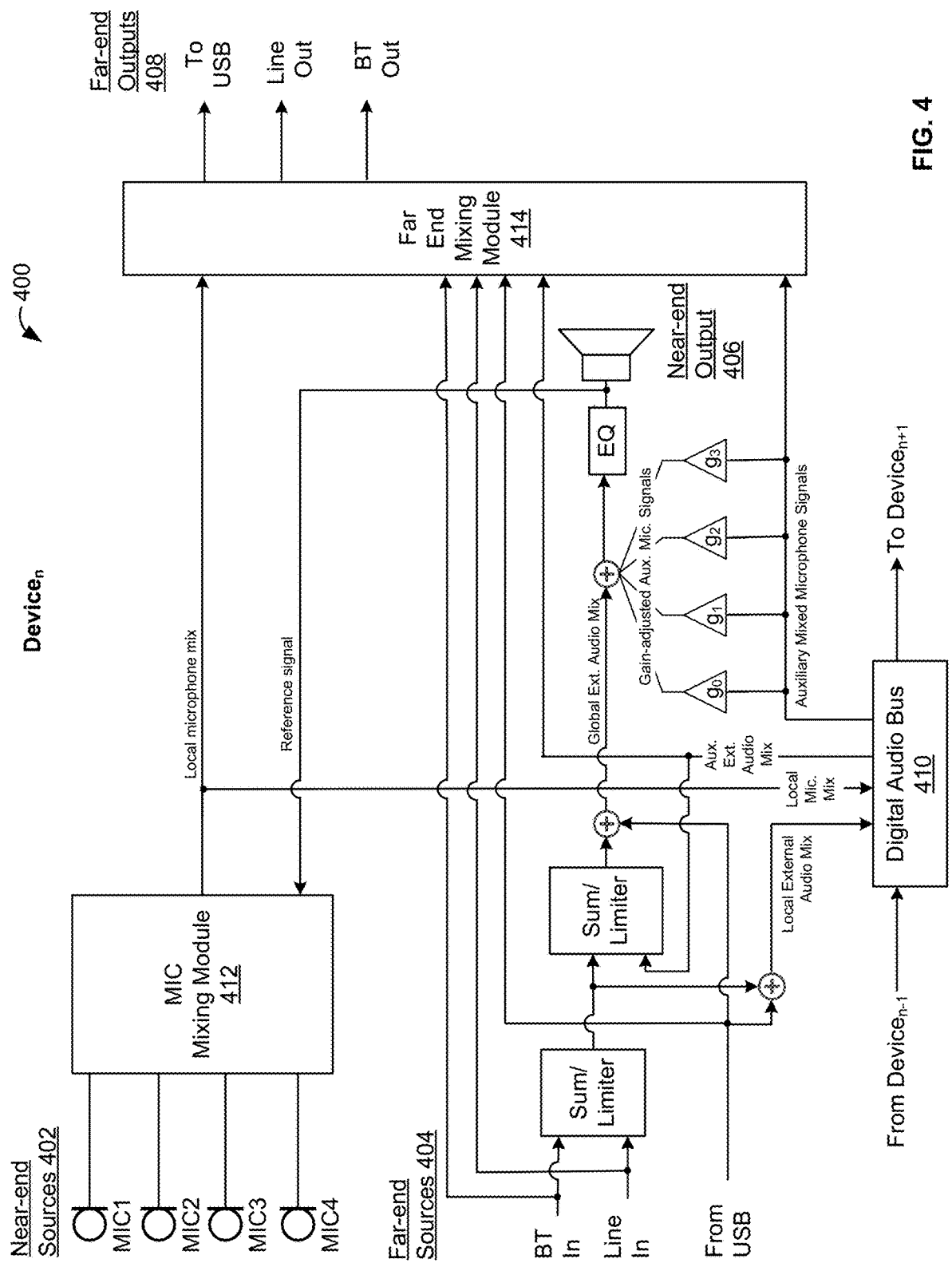
FIG. 4 is a functional block diagram of an exemplary conferencing device, in accordance with some embodiments.

Referring additionally to FIG. 4, shown is a functional block diagram of an exemplary conferencing device 400 for facilitating a conference call, video conference, webinar, or other meeting between multiple participants in separate and/or large conferencing spaces, in accordance with embodiments. The conferencing device 400 may represent or be similar to one or more of the conferencing devices 102/200/302 described herein, for example, in terms of operation and/or individual components. In addition, the conferencing device 400 may be coupled to one or more other conferencing devices in series, so as to form a daisy-chain or line topology for exchanging audio signals and other information between the devices, similar to the daisy-chain configurations of FIG. 1 and/or FIG. 3, for example. Each of the other conferencing devices within the daisy-chain may be the same as or similar to the conferencing device 400, and all of the daisy-chained conferencing devices may cooperate to form a conferencing system, similar to the conferencing system 300 of FIG. 3, for example.

According to the illustrated embodiment, the conferencing device 400 may be configured to receive one or more near-end audio signals from one or more near-end audio sources 402 included in or communicatively connected to the device 400. As an example, the near-end audio sources 402 may include four microphones MIC1, MIC2, MIC3, and MIC4 for detecting and capturing speech or other sounds produced by near-end or in-room participants and converting the sounds into audio signals (also referred to herein as "microphone signals). In other embodiments, the conferencing device 400 may include more or fewer microphones, or other types of near-end audio sources.

The conferencing device 400 may also be configured to receive one or more external audio signals from one or more far-end audio sources 404 of the conferencing device 400. For example, the far-end audio sources 404 may include input connections to one or more external communication ports (or a communication interface) communicatively coupled to one or more external communication devices (such as, e.g., external communication devices 106 shown in FIG. 1) for receiving, from one or more remote devices, audio signals representing speech or other sounds produced by remote or far-end participants. The external communications ports may include, for example, a Bluetooth® transceiver ("BT In"), a USB port ("From USB"), and an audio input/output port ("Line In").

The conferencing device 400 may also include a near-end output device 406, such as, e.g., a loudspeaker or other speaker device, for providing an audio output to one or more in-room participants. In addition, the conferencing device 400 may be configured to provide an audio output to one or more remote participants via one or more far-end outputs 408, which may be coupled to corresponding external communication ports of the device 400. For example, the far-end outputs 408 may include output connections to the USB port ("To USB"), the audio input/output port ("Line Out"), the Bluetooth® transceiver ("BT Out"), and/or any other external communication ports. Also, the conferencing device 400 may include a digital audio bus 410 and a pair of local connection ports coupled thereto (such as, e.g., first connection port 224 and second connection port 226 shown in FIG. 2) for physically connecting the conferencing device 400 to one or more other conferencing devices in the daisy-chain configuration, as described herein.

As shown in FIG. 4, the conferencing device 400 includes a microphone mixing module 412 for processing the microphone signals output by the microphones 402 and generating a local microphone mix representing all sounds detected by the microphones MIC1, MIC2, MIC3, and MIC4, for example. In some embodiments, the microphone mixing module 412 may be configured to control incoming signal amplitude or gain, convert analog signals to digital form, apply acoustic echo cancellation and noise reduction techniques, apply automixing techniques, and/or perform other signal processing tasks for generating the local microphone mix. The microphone mixing module 412 may be implemented, for example, using software executed by one or more processor, firmware hosted by one or more digital signal processors, and/or hardware. The local microphone mix (such as, e.g., $MIC_n$ of FIG. 3) may be provide to a far-end mixing module 414, which generates a far-end output signal (e.g., FEE of FIG. 3) based on the local microphone mix and other inputs described herein. The local microphone mix may also be provided to the digital audio bus 410 for transmission to the other conferencing devices in the daisy-chain, as shown in FIG. 4. In some cases, the microphone mixing module 412 may receive a reference signal from the near-end output 406 for echo cancellation purposes. As shown in FIG. 4, the reference signal may include the loudspeaker signal provided to near-end output 406, so as to prevent echo of the near-end voices when the local microphone mix is transmitted to the far-end outputs 408.

The external audio signals received from the far-end audio sources 404 may also be provided to the far-end mixing module 414 for inclusion in the far-end output signal, which may be transmitted to each of the far-end outputs 408. In embodiments, the far-end mixing module 414 may employ matrix-mixing techniques to generate a different external audio mix for each far-end output 408, so that the external audio signal received via one external communication port is not transmitted back through the same external communication port (such as, e.g., $EXT_{n*}$ of FIG. 3). For example, the external audio mix provided to the Bluetooth® transceiver (e.g., BT Out) may not include the external audio signals received via the same source (e.g., BT In). Similarly, the external audio mix provided to the audio input/output port (e.g., Line Out) may not include the external audio signals received via the same port (e.g., Line In). And the external audio mix provided to the USB port (e.g., To USB) may not include the external audio signals received via the same port (e.g., From USB).

In embodiments, each conferencing device, including the conferencing device 400, may generate a local audio output signal for output to the other conferencing devices along the daisy-chain using the digital audio bus connections and other techniques described herein. The local audio output signal provided by each conferencing device (such as, e.g., $AUX_n$ of FIG. 3) may include a near-end audio mix (such as, e.g., $MIC_n$ of FIG. 3) comprising the microphone signals detected by the microphones of that conferencing device, and an external audio mix (such as, e.g., $EXT_n$ of FIG. 3) comprising the external audio signals received by the far-end audio sources of the same device. In some cases, each conferencing device 400 may combine its local audio output signal with the auxiliary audio output signals received from other conferencing devices (such as, e.g., $AUX_{n-1}$, $AUX_{n+1}$, etc. of FIG. 3) via the digital audio bus 410, to create one mixed auxiliary output signal for transmission to one or more of the other conferencing devices coupled to the digital audio bus 410. In other cases, the near-end audio mix and the external audio mix may be provided as individual signals to the digital audio bus 410 for dissemination to the other devices, without first mixing these signals together or with any auxiliary audio output signals received from other devices.

According to embodiments, in addition to the local microphone mix and the customized external audio mix, the far-end output signal may also include the auxiliary audio output signals received from one or more of the other conferencing devices coupled to the digital audio bus 410. Each received auxiliary audio output signal may include an auxiliary near-end mix comprising the mixed microphone signals captured by one or more other conferencing devices in the daisy-chain and an auxiliary far-end mix comprising the external audio signals received by the same one or more other conferencing devices. As shown in FIG. 4, the auxiliary far-end audio mix (also referred to as "auxiliary external audio mix") and the auxiliary near-end audio mix (also referred to as "auxiliary mixed microphone signals") may be separated from the received auxiliary signal and individually provided to the far-end mixing module 414 for inclusion in the far-end output signal. The auxiliary far-end audio mix may also be combined with the local far-end audio signals received from the far-end audio sources 404 to generate a global external audio mix (e.g., $EXT_{Global}$). As illustrated, this global external audio mix and the auxiliary near-end audio mix may be included in a loudspeaker signal (such as, e.g., $LS_n$ of FIG. 3) that is generated for output to the in-room participants via the near-end audio output 406.

In embodiments, prior to creating the loudspeaker signal, the conferencing device 400 may be configured to apply a gain adjustment value ($g_n$) to each of the auxiliary mixed microphone signals included in the auxiliary near-end audio mix, so that all auxiliary microphone signals are output by the loudspeaker 406 at the same signal level. Such gain adjustments ensure that each of the other in-room participants' voices can be heard uniformly by the participants using the conferencing device 400, regardless of the room size or the distance between conferencing device 400 and other conferencing devices. The technique, also referred to as "voice lift," may be configured to adjust the level or strength of each auxiliary microphone signal only as needed to supplement or enhance signal intelligibility at the conferencing device 400, rather than fully reproducing the signals or increasing the overall volume of the loudspeaker, which may be perceived as too loud or troublesome. For example, voice lift may be applied to raise the level of a participant speaking on the opposite end of a conferencing room or table, but may not be applied to those participants seated near the listener, so as to help ensure a uniform signal level for all in-room voices.

The voice lift technique may be implemented by amplifying or attenuating a gain of each auxiliary mixed microphone signal before the signal reaches the near-end output 406. The amount of voice lift or gain adjustment applied may be based on a relative position of the originating conferencing device, for example, within the conferencing space or within the daisy-chain sequence, as compared to the receiving conferencing device 400. As an example, the conferencing device 400 may first determine a sequential order or relative location of the other conferencing device that originally captured a given auxiliary microphone signal and then calculate a gain adjustment value for that signal based on the determined position.

In some embodiments, the conferencing device 400 may be configured to apply zoning rules to help select an appropriate amount of gain adjustment for each auxiliary microphone signal depending on its place of origination. The zoning rules may be configured to apply graduated attenuation to each microphone signal based on the order of the corresponding conferencing device within the daisy-chain. For example, the zoning rules may determine that the auxiliary microphone signals of adjacent conferencing devices need not be included, or can be largely or completely attenuated, in the near-end audio mix. This may be because the voices of in-room participants using an adjacent conferencing device (or otherwise within an adjacent zone) may be intelligible or audible enough, as is or without reinforcement, to the in-room participants using the conferencing device 400. As another example, the voices of in-room participants using more distantly positioned conferencing devices (or otherwise within a distant zone) may be too faint to be intelligible at the conferencing device 400. In such cases, the zoning rules may proportionately adjust the gain adjustment value applied to each auxiliary microphone signal based on the distance, or the number of daisy-chain positions, between the conferencing device 400 and the conferencing device providing the signal. For example, more gain may be applied to signals received from conferencing devices that are further down in the daisy-chain, and less gain may be applied to signals that are closer to the conferencing device 400.

In some cases, the gain adjustment value may be an amount of attenuation applied to a given auxiliary microphone signal. In other cases, the gain adjustment value may be an amount of amplification that is applied to the auxiliary microphone signal. As will be appreciated, attenuation and amplification can be relative terms, and either or both may be implied by the term "gain adjustment." Other techniques for adjusting the gain of auxiliary microphone signals to achieve a uniform level are also contemplated. According to embodiments, gain adjustment may be applied to the auxiliary microphone signals using appropriate software executing on one or more processors (e.g., DSP(s)), hardware (e.g., one or more amplifiers), or a combination thereof.

In one exemplary embodiment, the conferencing device 400 may be positioned at a first position within the daisy-chain (such as, e.g., device A of FIG. 1) and may receive auxiliary audio signals from conferencing devices in a second position (such as, e.g., device B of FIG. 1), a third position (such as, e.g., device C of FIG. 1), a fourth position (such as, e.g., device D of FIG. 1), and a fifth position (such as, e.g., device E of FIG. 1). In such cases, using zoning rules preselected for the daisy-chain configuration of FIG. 1, the first conferencing device A may apply, to a first auxiliary mixed microphone signal received from the second conferencing device B, a first gain adjustment value ($g_0$) that largely or completely attenuates (e.g., $g_0 = -\infty$ dB) and/or applies no reinforcement to the first auxiliary mixed microphone signal. This gain adjustment value may be selected by the zoning rules because device B is positioned next to device A and therefore, the first microphone signal may be intelligible to the participants at device A with little or no supplementing. For a second auxiliary mixed microphone signal received from the third conferencing device C, the zoning rules may apply a second gain adjustment value ($g_1$) that is greater than $g_0$ (e.g., $g_1=-30$ dB), or provides more reinforcement and/or less attenuation than $g_0$, to the second auxiliary mixed microphone signal. In this case, at least some supplementing may be necessary to enhance the intelligibility of the second microphone signal because device C is two positions away from device A within the daisy-chain order.

A third gain adjustment value ($g_2$) that is larger than $g_1$ (e.g., $g_2=-20$ dB), or provides more reinforcement and/or less attenuation than $g_1$, may be applied to a third auxiliary mixed microphone signal received from the fourth conferencing device D. The zoning rules may require a larger reinforcement value for the third microphone signal because device D is three positions away from device A. Finally, a fourth gain adjustment value ($g_3$) applied to a fourth auxiliary mixed microphone signal received from the fifth conferencing device E may have the largest value of all (e.g., $g_3=-10$), or may provide the greatest amount of reinforcement and/or least or no attenuation. In this case, the zoning rules may require the largest reinforcement value for the fourth microphone signal because device E is four positions away, or furthest, from device A.

In some embodiments, the physical distance between any two conferencing devices may be estimated, or calculated, at the time of daisy-chain order discovery and used to determine the gain adjustment values described above. In one example embodiment, the distance at which adjacent conferencing devices are most likely to be spaced apart within a typical conferencing scenario may be a preset value. This preset value for adjacent devices may be used to infer the actual distance between any given pair of conferencing devices based further on the order and position of those devices within the daisy-chain. For example, to calculate the distance from device A to device C, the preset distance value may be multiplied by the difference between the daisy-chain position of device A (e.g., position 1) and the daisy-chain position of device C (e.g., position 3). In another example embodiment, the distance between any two conferencing devices may be directly calculated using acoustical measurements taken from one device to the next using acoustic processing techniques, as will be appreciated.

Figure 5:
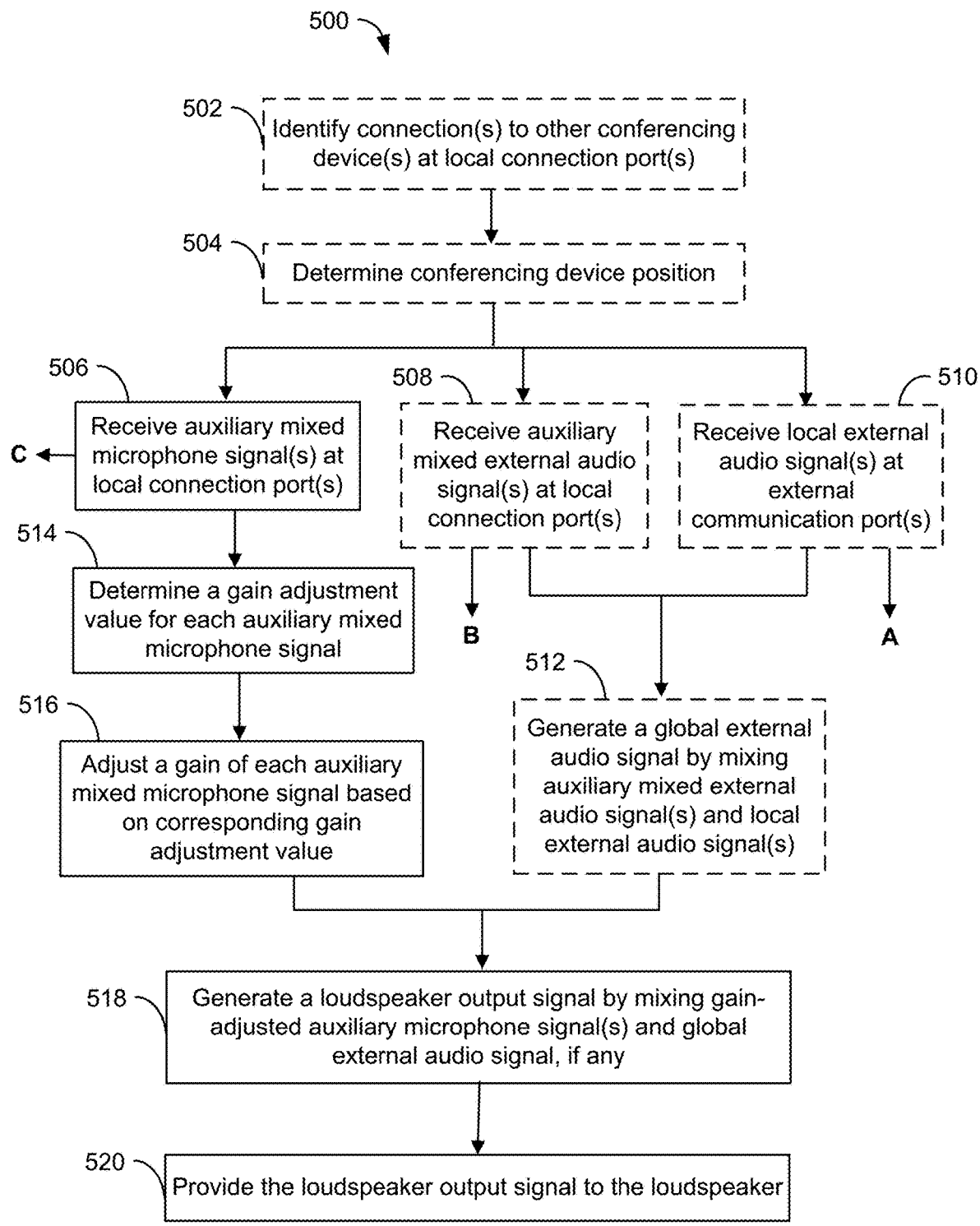
FIGS. 5 and 6 are flowcharts illustrating exemplary operations for processing audio signals in a conferencing device, in accordance with some embodiments.
Figure 6:
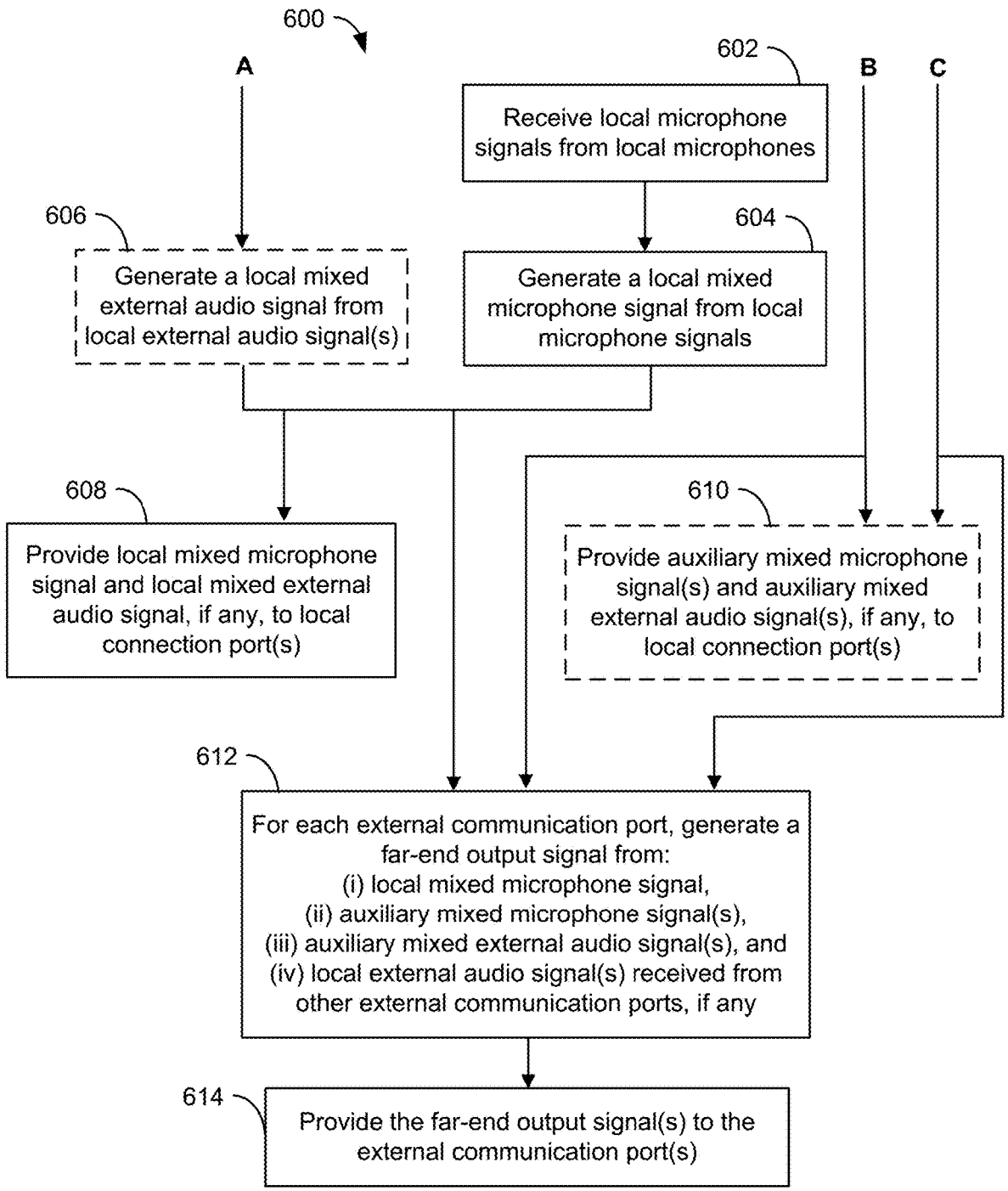

FIGS. 5 and 6 illustrate exemplary methods 500 and 600 for processing a plurality of audio signals associated with a conferencing environment (such as, e.g., conferencing environment 100 shown in FIG. 1) comprising a plurality of conferencing devices (such as, e.g., conferencing devices 102 shown in FIG. 1) connected to each other or arranged in a daisy-chain configuration, in accordance with embodiments. The methods 500 and 600 may be performed using a first one of the conferencing devices (such as, e.g., conferencing device 200 shown in FIG. 2).

Each of the plurality of conferencing devices may comprise at least one microphone (such as, e.g., microphone(s) 202 shown in FIG. 2), at least one loudspeaker (such as, e.g., loudspeaker 204 shown in FIG. 2), at least one processor (such as, e.g., processor(s) 208 shown in FIG. 2), one or more external communication ports (such as, e.g., communication interface 206 comprising ports 216, 218, and 222, as shown in FIG. 2) for connecting to one or more external communication devices (such as, e.g., external communication devices 106 shown in FIG. 1, and a pair of local connection ports (such as, e.g., local connection ports 224 and 226 shown in FIG. 2) for connecting to one or more of the other conferencing devices within the environment.

As described herein, the plurality of conferencing devices may be connected to each other in series or "end-to-end," for example, by coupling a first local connection port of each conferencing device to a second local connection port of another conferencing device (e.g., using cables 110 shown in FIG. 1) until each conferencing device is connected to at least one other conferencing device, thus forming a daisy-chain (e.g., as shown in FIGS. 1 and 3). In embodiments, each conferencing device further comprises a digital audio bus (e.g., digital audio bus 214 shown in FIG. 2) configured to facilitate communication with (or between) the first and second local connection ports, as well as the one or more processors of the conferencing device, and facilitate formation of the daisy-chain configuration. As also described herein, the conferencing devices may be configured to leverage this daisy-chain configuration to quickly and efficiently communicate audio signals and other information with each other.

In embodiments, the methods 500 and 600 may be utilized to process audio signals for carrying out one or more of the operations described herein and shown in the figures, such as, for example, FIGS. 3 and 4. For example, method 500 may be used to process audio signals received from one or more sources and based thereon, generate a loudspeaker output signal for the loudspeaker of the conferencing device. Method 600 may be used to process audio signals received from one or more sources and based thereon, generate a first mixed audio output signal for transmission through one or more of the local connection ports of the conferencing device and a second mixed audio output signal for transmission through one or more of the external communication ports of the conferencing device. One or more processors and/or other processing components (e.g., analog to digital converters, encryption chips, etc.) within or external to the conferencing device may perform any, some, or all of the steps of the methods 500 and/or 600. One or more other types of components (e.g., memory, input and/or output devices, transmitters, receivers, buffers, drivers, discrete components, etc.) may also be utilized in conjunction with the processors and/or other processing components to perform any, some, or all of the steps of the methods 500 and/or 600.

Method 500 may begin at step 502 with identifying one or more connections to the one or more other conferencing devices at the local connection ports of a given conferencing device (also referred to herein as "the first conferencing device"). For example, the conferencing device may be configured to identify the presence or absence of a physical connection at each of the local connection ports. In some embodiments, identifying the one or more connections to other conferencing devices includes identifying characteristics about or associated with the one or more connections, such as, for example, the order or daisy-chain position of the other device connected to a given local connection port. In such cases, the conferencing devices may share their order within the daisy-chain (e.g., first, second, third, etc.) with the other conferencing devices coupled thereto, e.g., via the digital audio bus. For example, each conferencing device may send its position within the daisy-chain to the other conferencing device coupled to its second local connection port, if any, and/or may receive position information at the first local connection port from the other conferencing device coupled thereto, if any.

At step 504, a position of the given conferencing device within the daisy-chain configuration may be determined upon identifying the one or more connections, or based thereon. In some embodiments, the digital audio bus is used to automatically and dynamically determine the position of the given device within the daisy-chain configuration using a self-discovery protocol, as described herein. For example, if the digital audio bus identifies a connection at a first connection port (e.g., "OUT") of the given device but no connection at a second connection port (e.g., "IN"), then the digital audio bus may determine that the given conferencing device is at the beginning of the daisy-chain, or in the first position. Conversely, if the digital audio bus identifies a connection at the second connection port but no connection at the first connection port, then the digital audio bus may determine that the given conferencing device is at the end of the daisy-chain, or in the last position. Alternatively, if the digital audio bus identifies connections at both of the local connection ports, then the daisy-chain order of the given conferencing device may be determined by sequentially incrementing the order of the immediately preceding device, or the conferencing device coupled to the second connection port of the first conferencing device. For example, if the other conferencing device coupled to the second connection port is identified as being in the third position of the daisy-chain, the first conferencing device will assign itself to the fourth position. Using similar steps, the other conferencing device coupled to the first connection port of the first conferencing device may assign itself to the fifth position of the daisy-chain, and so on.

In other embodiments, one of the plurality of conferencing devices may be assigned as a "master device," while the rest of the conferencing devices may be assigned as "slave devices." In such cases, the master device may be tasked with assigning daisy-chain positions to each of the slave devices using a serial discovery process and sending daisy-chain position information to each of the other conferencing devices, as described herein. For example, the master status may be automatically assigned to the device that occupies the first position within the daisy-chain. The master device may identify or discover the first slave device by determining which device is connected to its first connection port. That first slave device will be assigned the second daisy-chain position. The master device may then identify which slave device is connected to the first connection port of the first slave device and assign that second slave device to the third daisy-chain position, and so forth. Each of the slave devices may be assigned a corresponding sequential identifier, which signifies their order of discovery and configures them as slave nodes on the digital audio bus. These sequential identifiers may be shared across the digital audio bus and used by each conferencing device to determine their own daisy-chain position as well as the positions of their neighbors and other devices.

Once the daisy-chain position of the given conferencing device has been determined, the method 500 may continue to steps 506, 508, and/or 510. In some cases, the method 500 may begin at these steps, such as, for example, in scenarios where the daisy-chain position of the given conferencing device was previously determined (e.g., at start-up) and no changes to the daisy-chain are anticipated or detected. In other cases, the method 500 may always begin at step 502, so as to confirm the given conferencing device's current daisy-chain position before proceeding to steps 506/508/510.

At step 506, the given conferencing device receives one or more auxiliary mixed microphone signals (such as, e.g., $MIC_{n-1}$, $MIC_{n+1}$, etc. of FIG. 3) from at least one of the local connection ports. Each of auxiliary mixed microphone signal may comprise a mix of the microphone signals captured by a respective one of the other conferencing devices within the daisy-chain. At step 508, the given conferencing device receives one or more auxiliary mixed external audio signals (such as, e.g., $EXT_{n-1}$, $EXT_{n+1}$, etc. of FIG. 3) from at least one of the local connection ports. Each auxiliary mixed external audio signal may comprise a mix of the far-end or external audio signals received by a respective one of the other conferencing devices within the daisy-chain.

In some embodiments, steps 506 and 508 may occur substantially simultaneously, or may be combined into one step, for example, in cases where the auxiliary mixed microphone signals and the auxiliary mixed external audio signals are combined and transmitted as an auxiliary audio mix (such as, e.g., $AUX_{n-1}$, $AUX_{n+2}$, etc. of FIG. 3). In other embodiments, steps 506 and 508 may occur independently, for example, primarily depending on when the respective near-end participants and/or far-end participants communicatively connected to, or associated with, the other conferencing devices decide to contribute to the conference call. In still other embodiments, the first conferencing device may not receive any auxiliary mixed external audio signals, for example, if there are no external communication devices coupled to the other conferencing devices within the daisy-chain. In such cases, the method 500 may not include step 508.

As an example, one of the auxiliary audio signals received at steps 506 and/or 508 may be provided by the other conferencing device that is located at the immediately preceding position and is connected to the input connection port of the first conferencing device (such as, e.g., $AUX_{n-1}$ of FIG. 3). Another of the auxiliary audio signals received at steps 506 and/or 508 may be provided, for example, by the other conferencing device that is located at the immediately succeeding position and is connected to the output connection port of the first conferencing device (such as, e.g., $AUX_{n+1}$ of FIG. 3). As another example, one of the auxiliary audio signals received at steps 506 and/or 508 may be provided by the other conferencing device that is located at the end position of the daisy-chain and/or is not physically connected to one of the local connection ports (such as, e.g., $AUX_{n+2}$ in FIG. 3). In each of these examples, the auxiliary audio signals may be transmitted from device to device or via the multi-channel link created upon connecting the digital audio buses of all the conferencing devices in series (e.g., as shown in FIG. 3).

At step 510, the given conferencing device receives one or more local external audio signals (such as, e.g., $EXT_n$ of FIG. 3) at the one or more external communication ports. In embodiments, step 510 may occur independently of steps 506 and 508, for example, depending primarily on when the respective far-end participants communicatively connected to or associated with the given conferencing device decide to contribute to the conference call. In some embodiments the first conferencing device may not receive any local external audio signals, for example, if there are no external communication devices coupled to the given conferencing device. In such cases, the method 500 may not include step 510.

If steps 508 and/510 are performed, the method 500 may further include step 512, wherein a global external audio signal (such as, e.g., $EXT_{Global}$ of FIG. 3) is generated by mixing any auxiliary mixed external audio signals received at step 508 and/or any local external audio signals received at step 510. And from step 506, the method 500 may continue to step 514. As shown in FIGS. 5 and 6, steps 506, 508, and 510 may also serve as inputs to or steps of the method 600, as will be described in more detail herein.

At step 514, a gain adjustment value is determined for each of the one or more auxiliary mixed microphone signals based on a position of the corresponding other conferencing device within the daisy-chain configuration relative to a position of the given conferencing device. At step 516, a gain value for each of the one or more auxiliary mixed microphone signals is adjusted based on the corresponding gain adjustment value determined at step 514, thus creating a gain-adjusted version of each signal. In embodiments, the gain-adjustment value may be selected to reinforce, or raise the level of, voice signals that are located far from the given conferencing device (e.g., on the other side of the room) and therefore, have poor intelligibility at the location of that device. In embodiments, the gain adjustment value for each of the one or more auxiliary mixed microphone signals may be proportional to a distance between the given conferencing device and the corresponding other conferencing device. In some cases, gain adjustment values may be applied on a graduated scale depending on this distance and/or a difference in the daisy-chain positions of each conferencing device.

For example, determining the gain adjustment value for each auxiliary microphone signal may include identifying a first auxiliary mixed microphone signal as being received from another, or second, conferencing device positioned adjacent to the given, or first, conferencing device within the daisy-chain configuration, and selecting a first gain adjustment value that decreases a strength of, or attenuates, the first auxiliary mixed microphone signal based on the identified position of the second conferencing device. In some cases, the level of the first signal may be completely attenuated or excluded from the near-end audio mix because the second conferencing device is close enough to the first conferencing device that reinforcement of the first signal is not required.

As another example, determining the gain adjustment value for each of the one or more auxiliary mixed microphone signals may further include identifying a second auxiliary mixed microphone signal as being received from yet another, or a third, conferencing device positioned non-adjacent to the first conferencing device within the daisy-chain configuration, and selecting a second gain adjustment value that adjusts a strength, or signal level, of the second auxiliary mixed microphone signal based on the identified position of the third conferencing device. In such cases, the second gain adjustment value may adjust the strength of the second auxiliary mixed microphone signal to be above that of the first auxiliary mixed microphone signal. In some cases, this adjustment may be configured to adjust the second auxiliary microphone signal to a level that is substantially similar to a signal level of local microphone signals captured by the microphones of the first conferencing device (e.g., in step 602 of FIG. 6), so that the voices of all in-room participants may be heard uniformly across the conferencing room or space.

Step 518 includes generating a loudspeaker output signal (such as, e.g., $LS_n$ of FIG. 3) by mixing the one or more gain-adjusted auxiliary mixed microphone signals (e.g., $MIC^*_{n-1}$, $MIC^*$, etc. of FIG. 3) and the global external audio signal generated at step 512, if any. Step 520 includes providing the loudspeaker output signal to the loudspeaker of the given or first conferencing device for output to the in-room participants that are seated around, or are within audible range of, the first conferencing device. In embodiments, the given conferencing device may produce at least two other outputs, besides the loudspeaker output signal, as shown in FIG. 6.

More specifically, method 600 may begin at step 602 with receiving one or more local microphone signals from the at least one microphone included in the given conferencing device. For example, the microphones (such as, e.g., MIC1, MIC2, MIC3, and MIC4 shown in FIG. 4) may be configured to capture near-end audio, such as speech or other sounds, produced by one or more in-room participants (such as, e.g., near-end participants 104 shown in FIG. 1) located within a predetermined detection rage of the given conferencing device. At step 604, a local mixed microphone signal, or near-end audio mix, (such as, e.g., MICE of FIG. 3) may be generated by mixing (e.g., automixing) the local microphone signals into one signal (or channel), using, for example MIC mixing module 412 of FIG. 4.

At step 606, a local mixed external audio signal (such as, e.g., $EXT_n$ of FIG. 3) may be generated by mixing the local external audio signals received from the external communication ports at step 510 of method 500. At step 608, the local mixed external audio signal generated at step 606 and the local mixed microphone signal generated at step 604 may be provided to at least one of the local connection ports for transmission to the other conferencing devices within the daisy-chain via the digital audio bus. In some embodiments, the local audio signals may be mixed into one auxiliary signal (such as, e.g., $AUX_n$ of FIG. 3) prior to transmission, or may be transmitted individually via the digital audio bus.

In some embodiments, the method 600 includes step 610, where any auxiliary mixed external audio signals received at step 508 of method 500 and the auxiliary mixed microphone signals received at step 506 of method 500 are provided to at least one of the local connection ports for transmission to the other conferencing devices within the daisy-chain via the digital audio bus. In other embodiments, for example, where the auxiliary signals are shared on the digital audio bus using TDM slots and therefore, are already accessible to the other devices, step 610 may not be performed.

In some embodiments, steps 608 and 610 may be performed substantially simultaneously or as one step, for example, by providing a single mix comprising all audio to be output to the respective local connection port. In other embodiments, the auxiliary audio mixes (e.g., comprising auxiliary microphone and/or external audio signals) received at one of the local connection ports may be provided directly to the other local connection port for transmission to the other conferencing device coupled thereto, as needed. And the local audio mix (e.g., comprising local microphone and/or external audio signals) may be provided to one or both of the local connection ports, depending on the order of the given conference device, for transmission throughout the daisy-chain. For example, the conferencing device in the first position of the daisy-chain may only be connected to the conferencing device in the second position, via a first local connection port. This connection may serve as an upstream link for transmitting the local audio mix generated by the first position device to the second position device and a downstream link for receiving auxiliary audio mixes from the other conferencing devices within the daisy-chain via the second position device. If the conferencing device is positioned in the middle of the daisy-chain, the local audio mix generated by that conferencing device may be provided to both local connection ports for upstream and downstream transmission to the other conferencing devices. Likewise, the auxiliary audio mixes provided by the other conferencing devices may be received at both local connection ports, since the other devices are located both upstream and downstream.

Step 612 includes, for each of the one or more external communication ports, generating a far-end output signal (such as, e.g., $FE_n$ of FIG. 3) by mixing the local mixed microphone signal generated at step 604, the one or more auxiliary mixed microphone signals received at step 506 of method 500, the one or more auxiliary mixed external audio signals received at step 508 of method 500, and the local external audio signals received from each of the other external communication ports at step 510 of method 500, if any. Step 614 includes providing the far-end output signal to the respective external communication port. In embodiments, a different far-end output signal may be generated for each external communication port in order to ensure that the external audio signal received at a given external communication port is not output back through the same port, for example, using the far end mixing module 414 shown in FIG. 4.

The method 500 may end upon completion of step 520, and the method 600 may end upon completion of step 614.

Any process descriptions or blocks in figures should be understood as representing modules, segments, or portions of code which include one or more executable instructions for implementing specific logical functions or steps in the process, and alternate implementations are included within the scope of the embodiments of the invention in which functions may be executed out of order from that shown or discussed, including substantially concurrently or in reverse order, depending on the functionality involved, as would be understood by those having ordinary skill in the art.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

What is claimed is:

1. A conferencing device in daisy-chain communication with a plurality of other conferencing devices, the conferencing device comprising:
   one or more processors configured to generate a mix of a plurality of microphone signals received from one or more of the other conferencing devices based on relative positioning of said one or more other conferencing devices within the daisy-chain,
   wherein before combining the microphone signals to generate the mix, the one or more processors adjust at least one signal parameter associated with at least one of the received microphone signals based on the relative positioning of the one or more other conferencing devices within the daisy-chain, and
   wherein the at least one signal parameter is adjusted by an amount that is proportional to a distance between the conferencing device and the other conferencing device that captured the given microphone signal.

2. The conferencing device of claim 1, wherein the at least one signal parameter includes a gain value for a given microphone signal.

3. The conferencing device of claim 1, wherein the one or more processors are further configured to determine the position of the conferencing device within the daisy-chain and send the determined position to at least one of the other conferencing devices.

4. The conferencing device of claim 3, wherein said position is determined by identifying one or more connections to one or more of the other conferencing devices.

5. The conferencing device of claim 1, further comprising a first port and a second port for connecting to one or more of the other conferencing devices, at least one of the microphone signals being received via at least one of said ports.

6. The conferencing device of claim 5, further comprising a digital audio bus configured to:
   facilitate communication between the one or more processors and the first and second ports, and
   determine the position of the conferencing device within the daisy-chain based on a presence or absence of a connection at each port.

7. The conferencing device of claim 1, further comprising a loudspeaker, the one or more processors providing the mix to the loudspeaker for audio output.

8. The conferencing device of claim 1, further comprising a microphone for capturing audio and generating a local microphone signal, the one or more processors being further configured to provide the local microphone signal to at least one of the other conferencing devices.

9. The conferencing device of claim 1, further comprising a wireless transceiver for wirelessly receiving one or more of the microphone signals from at least one of the other conferencing devices in the daisy-chain.

10. A conferencing system comprising:
    a plurality of conferencing devices arranged in a daisy-chain configuration, each conferencing device comprising one or more processors configured to generate a mix of a plurality of microphone signals received from one or more other conferencing devices based on relative positioning of said one or more other conferencing devices within the daisy-chain configuration,
    wherein at each conferencing device, before combining the microphone signals to generate the mix, the one or more processors adjust at least one signal parameter associated with at least one of the received microphone signals based on the relative positioning of the one or more other conferencing devices within the daisy-chain, and
    wherein the at least one signal parameter is adjusted by an amount that is proportional to a distance between the conferencing device and the other conferencing device that captured the given microphone signal.

11. The conferencing system of claim 10, wherein the at least one signal parameter includes a gain value for a given microphone signal.

12. The conferencing system of claim 10, wherein each conferencing device determines its position within the daisy-chain configuration and sends the determined position to at least one other conferencing device.

13. The conferencing system of claim 12, wherein said position is determined by identifying one or more connections to one or more other conferencing devices.

14. The conferencing system of claim 10, wherein each conferencing device further comprises a loudspeaker, the one or more processors of said conferencing device providing the mix to the loudspeaker for audio output.

15. The conferencing system of claim 10, wherein two or more of the conferencing devices further comprise a wireless transceiver for wirelessly communicating at least one of the microphone signals between said conferencing devices.

16. The conferencing system of claim 10, wherein two or more of the conferencing devices further comprise a first port and a second port for connecting said conferencing devices, at least one of the microphone signals being received via at least one of said ports.

17. The conferencing system of claim 16, wherein each of the two or more conferencing devices further comprises a digital audio bus configured to:
- facilitate communication between the one or more processors and the first and second ports, and
- determine the position of the conferencing device within the daisy-chain based on a presence or absence of a connection at each port.

18. The conferencing system of claim 10, wherein each conferencing device further comprises a microphone for capturing audio and generating a local microphone signal, the one or more processors being further configured to provide the local microphone signal to at least one other conferencing device.

* * * * *

UNITED STATES PATENT AND TRADEMARK OFFICE
CERTIFICATE OF CORRECTION

PATENT NO. : 11,647,122 B2
APPLICATION NO. : 17/140687
DATED : May 9, 2023
INVENTOR(S) : Ali Enteshari et al.

It is certified that error appears in the above-identified patent and that said Letters Patent is hereby corrected as shown below:

In the Specification

Column 13, Line 19, "LSO to" should be changed to -- $LS_n$) to --.

Column 20, Line 32, "FEE of" should be changed to -- $FE_n$ of --.

Column 27, Line 62, "MIC*," should be changed to -- $MIC^*_{n+1}$, --.

Column 28, Line 15, "MICE" should be changed to -- $MIC_n$ --.

Signed and Sealed this
Thirtieth Day of April, 2024

Katherine Kelly Vidal
*Director of the United States Patent and Trademark Office*